L10625195B2

United States Patent
Kato et al.

(10) Patent No.: US 10,625,195 B2
(45) Date of Patent: *Apr. 21, 2020

(54) HONEYCOMB FILTER

(71) Applicant: NGK INSULATORS, LTD., Nagoya (JP)

(72) Inventors: Yasushi Kato, Nagoya (JP); Takahiro Kondo, Nagoya (JP); Junki Matsuya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 356 days.

This patent is subject to a terminal disclaimer.

(21) Appl. No.: 15/616,247

(22) Filed: Jun. 7, 2017

(65) Prior Publication Data

US 2017/0354912 A1 Dec. 14, 2017

(30) Foreign Application Priority Data

Jun. 13, 2016 (JP) .................... 2016-117313

(51) Int. Cl.
*B01D 46/24* (2006.01)
*B01D 53/94* (2006.01)
(Continued)

(52) U.S. Cl.
CPC ....... *B01D 46/2429* (2013.01); *B01D 46/247* (2013.01); *B01D 46/2455* (2013.01);
(Continued)

(58) Field of Classification Search
CPC .............. B01D 46/2455; B01D 46/247; B01D 53/9431; B01D 53/9409;
(Continued)

(56) References Cited

U.S. PATENT DOCUMENTS 7,507,460 B2   3/2009  Ichikawa et al.
2006/0029769 A1  2/2006  Ichikawa et al.
(Continued)

FOREIGN PATENT DOCUMENTS

WO    2004/052502 A1    6/2004

Primary Examiner — Amber R Orlando
(74) Attorney, Agent, or Firm — Burr & Brown, PLLC

(57) ABSTRACT

The honeycomb structure body has a dense part having a change ratio of porosity calculated by the following Expression (1) that is 1 to 5%. The honeycomb structure body also has an outside-diameter decreasing part in which the outside diameter decreases from the inflow end face to the outflow end face. The honeycomb structure body has a change ratio of average diameter calculated by the following Expression (2) that is 0.2 to 3%.

$$(1-P_x/P_y)\times 100, \quad \text{Expression (1):}$$

in Expression (1), $P_x$ denotes the porosity (%) at the center region of the outflow end face, and Py denotes the porosity (%) of a circumferential region of the outflow end face other than the center region.

$$(1-D_x/D_y)\times 100, \quad \text{Expression (2):}$$

in Expression (2), $D_x$ denotes the average diameter (mm) of the outflow end face, and $D_y$ denotes the average diameter (mm) of the inflow end face.

7 Claims, 11 Drawing Sheets

(51) Int. Cl.
  *B01D 35/04*  (2006.01)
  *B01J 35/10*  (2006.01)
  *B01J 35/04*  (2006.01)
  *F01N 3/022*  (2006.01)
  *B01J 29/76*  (2006.01)
  *C04B 35/195* (2006.01)

(52) U.S. Cl.
  CPC .......... *B01D 53/9431* (2013.01); *B01J 35/04* (2013.01); *B01J 35/10* (2013.01); *F01N 3/0222* (2013.01); *B01D 53/9409* (2013.01); *B01D 2046/2433* (2013.01); *B01D 2046/2437* (2013.01); *B01D 2046/2481* (2013.01); *B01D 2255/9155* (2013.01); *B01J 29/7615* (2013.01); *C04B 35/195* (2013.01)

(58) Field of Classification Search
  CPC .... B01D 2046/2433; B01D 2046/2437; B01D 2046/2481; B01D 2255/9155; B01J 35/04; B01J 35/10; B01J 29/7615; F01N 3/0222; C04B 35/195
  See application file for complete search history.

(56) References Cited

U.S. PATENT DOCUMENTS

| | | | |
|---|---|---|---|
| 2006/0105139 A1* | 5/2006 | Suwabe ............ | B01D 46/0001 428/116 |
| 2009/0011176 A1* | 1/2009 | Ichikawa .......... | B01D 46/2422 428/116 |
| 2014/0116016 A1* | 5/2014 | Mizuno ............. | B01D 46/2425 55/523 |

\* cited by examiner

HONEYCOMB FILTER

"The present application is an application based on JP-2016-117313 filed on Jun. 13, 2016 with Japan Patent Office, the entire contents of which are incorporated herein by reference."

BACKGROUND OF THE INVENTION

Field of the Invention

The present invention relates to honeycomb filters. More specifically the present invention relates to a honeycomb filter having excellent thermal shock resistance.

Description of the Related Art

Along with a recent rise in the awareness of environmental issues by the society as a whole, various techniques have been developed in the technical field of generating power by burning fuel, so as to remove harmful components from exhaust gas that is generated during burning of the fuel. Especially regulations on the removal of particulate matter emitted from a diesel engine are becoming stricter worldwide. A honeycomb filter with a honeycomb structure has been used as a filter to remove such particulate matter. Hereinafter a filter to remove particulate matter emitted from a diesel engine may be called a "DPF". "DPF" stands for "Diesel Particulate Filter". Hereinafter the particulate matters may be called "PM". "PM" stands for "Particulate Matter".

A conventionally proposed honeycomb filter for this purpose includes a honeycomb structure body having a porous partition wall that defines a plurality of cells, and a plugging portion to plug the cells at ends on any one side (see Patent Document 1, for example).

For a continuous use of such a honeycomb filter for a long time, the honeycomb filter has to be "regenerated". Through this regeneration processing, pressure loss of the honeycomb filter, which increased due to PM deposited inside over time, decreases to bring the performance of the filter to a state close to the initial state. Since a lot of PM included in exhaust gas is a combustible material, such as soot, conventional regeneration processing of a honeycomb filter burns trapped soot with gas at high temperatures for removal. In the following, the operation to burn the soot deposited inside of a honeycomb filter for removal may be called simply "regeneration" of the honeycomb filter.

[Patent Document 1] WO 2004/052502

SUMMARY OF THE INVENTION

A diesel engine generates more soot than that from a gasoline engine. Therefore "forced regeneration" is necessary for a honeycomb filter used as a DPF to burn trapped soot forcibly for removal. Forced regeneration is a regeneration processing to burn trapped soot forcibly for removal by using post injection or injection into exhaust pipe, for example. During such forced regeneration, trapped soot is burned at one time. As a result, a large thermal stress occurs on the honeycomb filter due to the burning of soot. Then such a conventional honeycomb filter has a problem that a breakage such as cracks occurs on the honeycomb filter during such forced regeneration. Therefore there is a demand for the development of a honeycomb filter as a DPF having excellent thermal shock resistance so that no cracks occur even during forced regeneration.

In view of such problems of the conventional techniques, the present invention provides a honeycomb filter having excellent thermal shock resistance.

The present invention provides the following honeycomb filter.

[1] A honeycomb filter, including a honeycomb structure body having an inflow end face and an outflow end face, the honeycomb structure body including: a porous partition wall defining a plurality of cells extending from the inflow end face to the outflow end face and serving as a through channel of fluid; and a circumferential wall disposed to surround the partition wall, and
a plugging portion disposed to plug any one of the ends of the cells in the honeycomb structure body, wherein
the honeycomb structure body has a dense part, the dense part including a center region of the outflow end face and being a part of the honeycomb structure body from the center region of the outflow end face along an axial direction, and the dense part having a change ratio of porosity of 1 to 5%, the change ratio of porosity being calculated by the following Expression (1), and
the honeycomb filter body has an outside-diameter decreasing part at least at a part of the honeycomb structure body in the axial direction, the outside-diameter decreasing part having an outside diameter of a plane orthogonal to the axial direction of the honeycomb structure body that decreases from the inflow end face to the outflow end face, and the honeycomb structure body has a change ratio of average diameter that is 0.2 to 3%, the change ratio of average diameter being calculated by the following Expression (2).

$$(1-P_x/P_y) \times 100, \quad \text{Expression (1):}$$

where in Expression (1), $P_x$ denotes porosity (%) at the center region of the outflow end face, and $P_y$ denotes porosity (%) of a circumferential region of the outflow end face other than the center region, $$(1-D_x/D_y) \times 100, \quad \text{Expression (2):}$$

where in Expression (2), $D_x$ denotes an average diameter (mm) of the outflow end face of the honeycomb structure body, and $D_y$ denotes an average diameter (mm) of the inflow end face of the honeycomb structure body.

[2] The honeycomb filter according to [1], wherein the center region of the inflow end face of the honeycomb structure body has a change ratio of porosity calculated by the following Expression (3) that is less than 1%.

$$(1-P'x/P'y) \times 100, \quad \text{Expression (3):}$$

where in Expression (3), P'x denotes porosity (%) at the center region of the inflow end face, and P'y denotes porosity (%) of a circumferential region of the inflow end face other than the center region.

[3] The honeycomb filter according to [1] or [2], wherein the dense part has porosity of 30 to 70%.

[4] The honeycomb filter according to any one of [1] to [3], wherein the outside-diameter decreasing part is present across an overall region of the honeycomb structure body in the axial direction.

[5] The honeycomb filter according to any one of [1] to [3], wherein the outside-diameter decreasing part is present at only a part of the honeycomb structure body in the axial direction.

[6] The honeycomb filter according to any one of [1] to [5], wherein the circumferential wall of the honeycomb structure body includes a circumference coating layer disposed at circumference of the partition wall.

[7] The honeycomb filter according to any one of [1] to [6], wherein the honeycomb structure body has a plurality of pillar-shaped honeycomb segments, and has a segmented structure in which the plurality of honeycomb segments are disposed adjacent to each other and lateral faces of the honeycomb segments are opposed to each other.

The honeycomb filter of the present invention has a dense part on the side of the outflow end face of the honeycomb structure body, and the dense part has a change ratio of porosity calculated by the above Expression (1) that is 1 to 5%. The honeycomb filter of the present invention further has an outside-diameter decreasing part in which the outside diameter of the honeycomb structure body decreases from the inflow end face to the outflow end face. The honeycomb structure body has a change ratio of average diameter calculated by the above Expression (2) that is 0.2 to 3%. With these configurations, the honeycomb filter of the present invention has the advantageous effects of having excellent thermal shock resistance. That is, the honeycomb structure body has a dense part as stated above on the side of the outflow end face. This configuration can effectively prevent cracks around the center region of the outflow end face even when large thermal stress occurs on the center region during forced regeneration of the honeycomb filter. The honeycomb structure body also has an outside-diameter decreasing part as stated above. This configuration can effectively prevent cracks on the inflow end face as well during forced regeneration of the honeycomb filter. When a honeycomb structure body has a dense part on the side of the outflow end face, thermal shock resistance of the honeycomb structure body on the side of the inflow end face may deteriorate relatively, so that cracks easily may occur on the side of the inflow end face of the honeycomb structure body. The honeycomb filter of the present invention has the dense part on the side of the outflow end face and the outside-diameter decreasing part in which the outside diameter decreases from the inflow end face to the outflow end face, and therefore the honeycomb filter as a whole can have excellent thermal shock resistance due to synergetic effect of these parts.

DESCRIPTION OF THE PREFERRED EMBODIMENTS

The following describes embodiments of the present invention. The present invention is not limited to the following embodiments. The present invention is therefore to be understood to include the following embodiments, to which modifications and improvements are added as needed based on the ordinary knowledge of a person skilled in the art without departing from the scope of the present invention.

Figure 1:
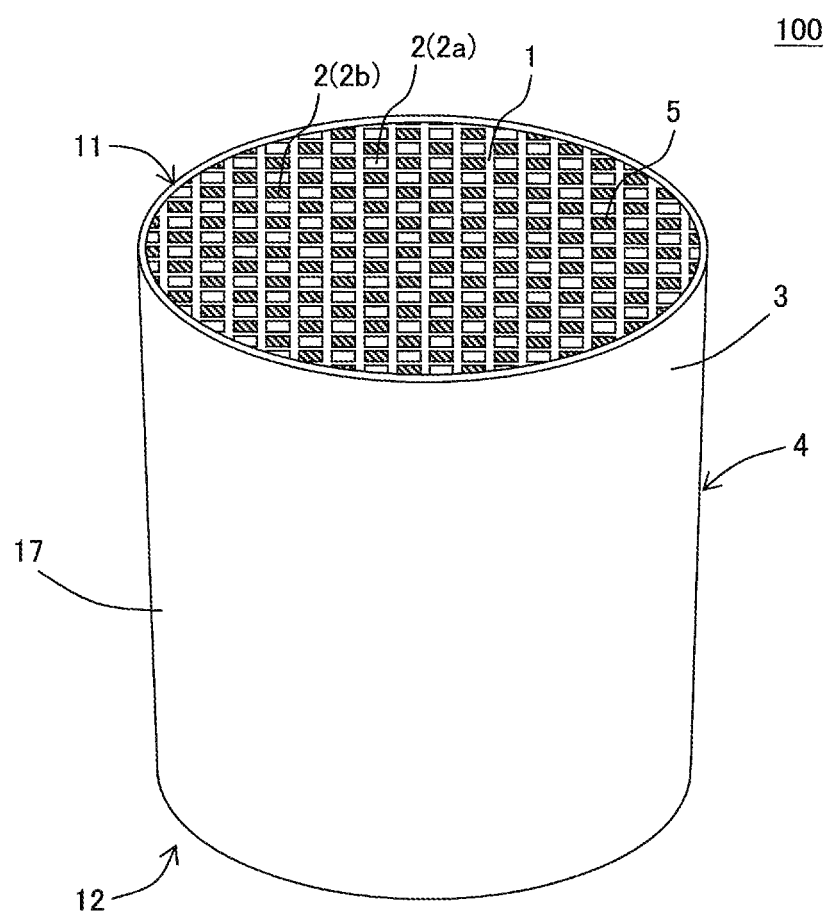
FIG. 1 is a perspective view schematically showing a first embodiment of a honeycomb filter of the present invention viewed from the inflow end face.
Figure 2:
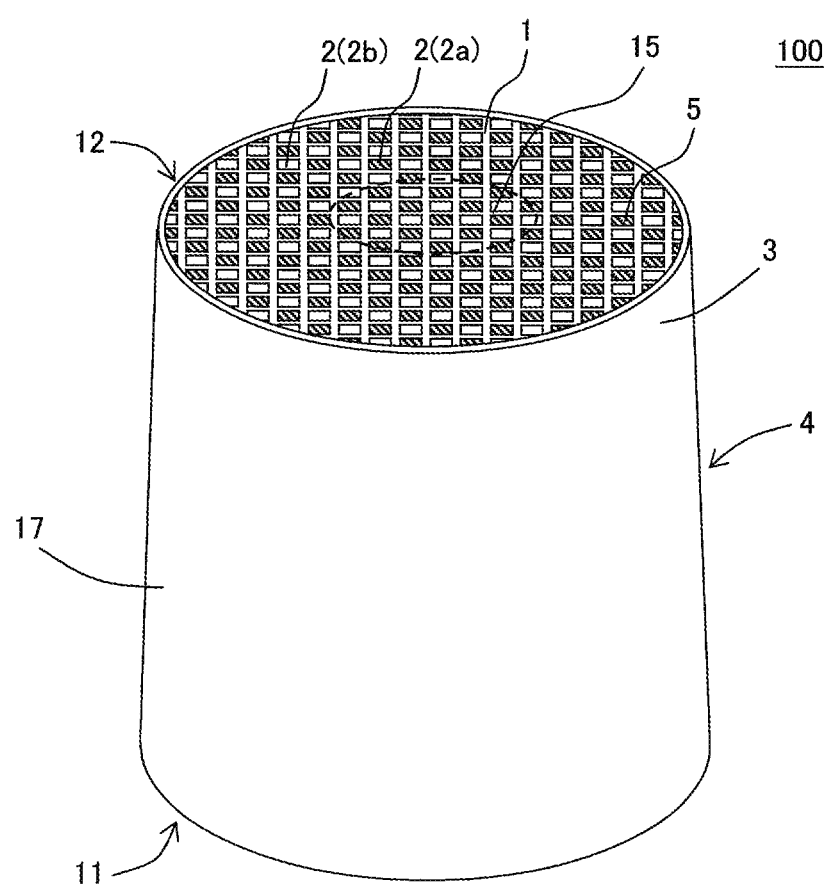
FIG. 2 is a perspective view schematically showing the first embodiment of the honeycomb filter of the present invention viewed from the outflow end face.
Figure 3:
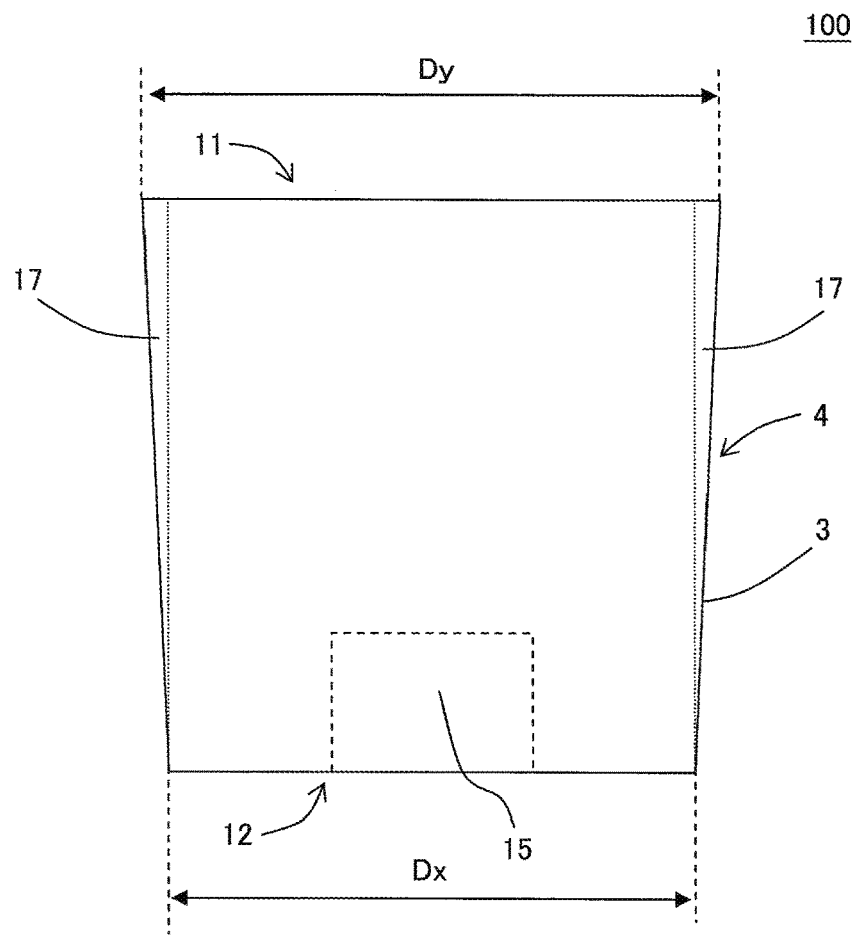
FIG. 3 is a lateral view schematically showing the lateral face of the honeycomb filter of FIG. 1.
Figure 4:
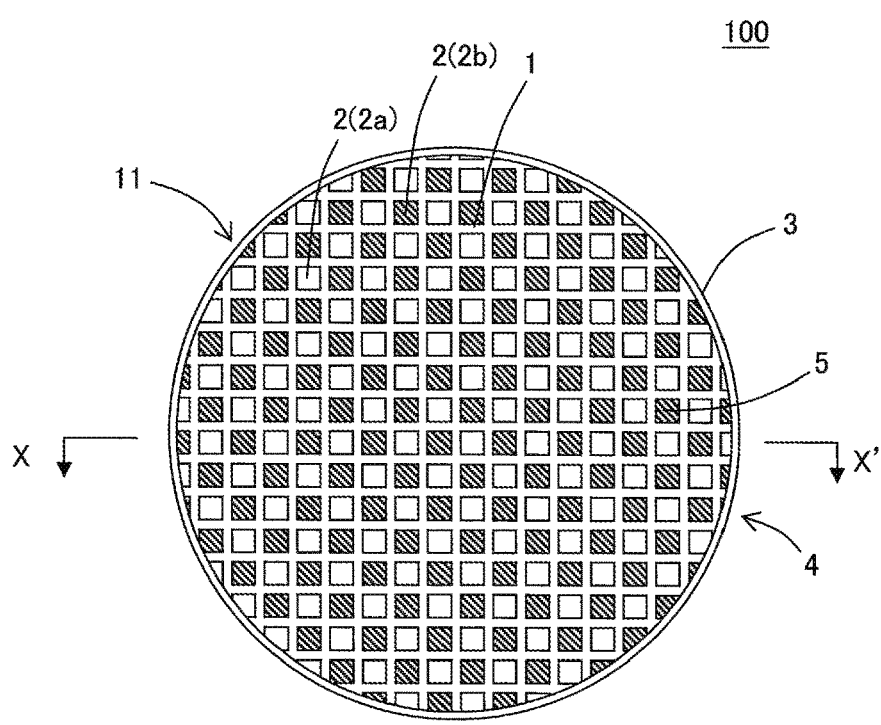
FIG. 4 is a plan view schematically showing the inflow end face of the honeycomb filter of FIG. 1.
Figure 5:
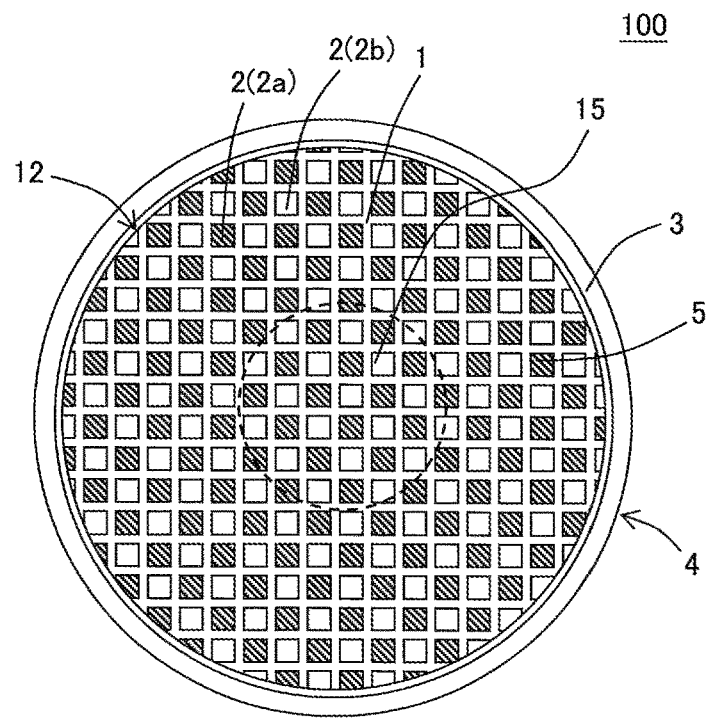
FIG. 5 is a plan view schematically showing the outflow end face of the honeycomb filter of FIG. 1.
Figure 6:
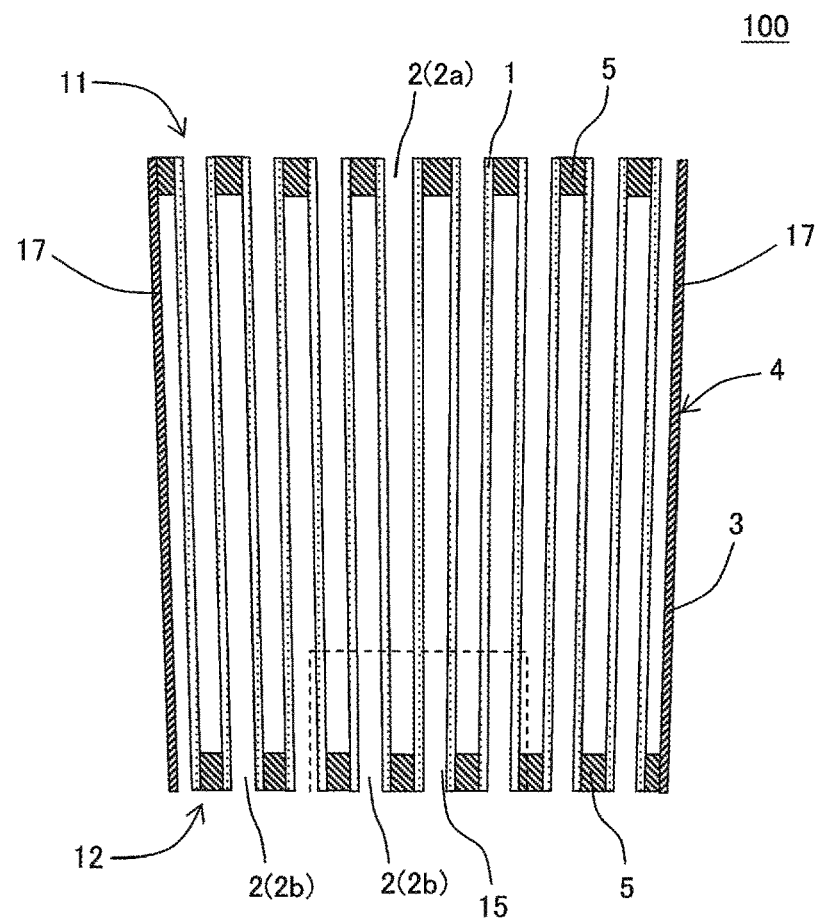
FIG. 6 is a schematic cross-sectional view taken along the line X-X' of FIG. 4.

(1) Honeycomb Filter (First Embodiment):

As shown in FIGS. 1 to 6, a first embodiment of the honeycomb filter of the present invention is a honeycomb filter 100 including a honeycomb structure body 4 having a porous partition wall 1 and a plugging portion 5 disposed at any one of the ends of cells 2 formed in the honeycomb structure body 4. The honeycomb structure body 4 has the porous partition wall 1 and a circumferential wall 3 disposed so as to surround the partition wall 1. FIG. 1 is a perspective view schematically showing the first embodiment of the honeycomb filter of the present invention viewed from the inflow end face. FIG. 2 is a perspective view schematically showing the first embodiment of the honeycomb filter of the present invention viewed from the outflow end face. FIG. 3 is a lateral view schematically showing the lateral face of the honeycomb filter of FIG. 1. FIG. 4 is a plan view schematically showing the inflow end face of the honeycomb filter of FIG. 1. FIG. 5 is a plan view schematically showing the outflow end face of the honeycomb filter of FIG. 1. FIG. 6 is a schematic cross-sectional view taken along the line X-X' of FIG. 4.

The partition wall 1 of the honeycomb structure body 4 defines a plurality of cells 2, and the plurality of cells extends from an inflow end face 11 to an outflow end face 12 and serves as a through channel of fluid. The plugging portion 5 is disposed so as to plug the cells 2 that are formed in the honeycomb structure body 4 at any one of the ends. That is, each of the plurality of cells 2 is plugged at any one of the ends with the plugging portion 5 that is disposed at open ends of the cells on the side of the inflow end face 11 or on the side of the outflow end face 12. In the thus configured honeycomb filter 100 of the present embodiment, the porous partition wall 1 functions as a filtering member to trap PM in exhaust gas. The plurality of cells 2 include inflow cells 2a, in which the plugging portion 5 is disposed at open ends of the outflow end face 12, and the cells 2 are open at the inflow end face 11. The plurality of cells 2 include outflow cells 2b as well, in which the plugging portion 5 is disposed at open ends of the inflow end face 11, and the cells 2 are open at the outflow end face 12.

The honeycomb structure body 4 has a dense part 15, and the dense part includes a center region of the outflow end face 12 and is a part of the honeycomb structure body 4 from the center region of the outflow end face 12 along an axial direction. The dense part has a change ratio of porosity of 1 to 5%, the change ratio of porosity being calculated by the following Expression (1). The honeycomb structure body 4 has an outside-diameter decreasing part 17 at least at a part of the honeycomb structure body 4 in the axial direction. The outside-diameter decreasing part has an outside diameter of a plane orthogonal to the axial direction of the honeycomb structure body 4 that decreases from the inflow end face 11 to the outflow end face 12. Due to such an outside-diameter decreasing part 17, the honeycomb structure body 4 has a change ratio of average diameter that is 0.2 to 3%. The change ratio of average diameter is calculated by the following Expression (2). The honeycomb structure body 4 in FIG. 6 has the outside-diameter decreasing part 17 across the overall region of the honeycomb structure body 4 in the axial direction.

$$(1-P_x/P_y) \times 100, \quad \text{Expression (1):}$$

in Expression (1), $P_x$ denotes the porosity (%) at the center region of the outflow end face 12, and $P_y$ denotes the porosity (%) of a circumferential region of the outflow end face 12 other than the center region.

$$(1-D_x/D_y) \times 100, \quad \text{Expression (2):}$$

in Expression (2), $D_x$ denotes the average diameter (mm) of the outflow end face 12 of the honeycomb structure body 4, and $D_y$ denotes the average diameter (mm) of the inflow end face 11 of the honeycomb structure body 4.

The honeycomb filter 100 of the present embodiment has a dense part 15 and an outside-diameter decreasing part 17 as stated above, and therefore it has the advantageous effect of having excellent thermal shock resistance.

The honeycomb structure body 4 has a dense part 15 as stated above on the side of the outflow end face 12. This configuration can effectively prevent cracks around the center region of the outflow end face 12 during forced regeneration of the honeycomb filter 100. That is, if large thermal stress occurs at the center region on the side of the outflow end face 12 during forced regeneration of the honeycomb filter 100, this configuration can effectively prevent cracks around the center region. When a honeycomb structure body 4 has such a dense part 15 on the side of the outflow end face 12, however, thermal shock resistance of the honeycomb structure body on the side of the inflow end face 11 may deteriorate relatively, so that cracks easily may occur on the side of the inflow end face 11 of the honeycomb structure body 4. The honeycomb filter 100 of the present embodiment has the dense part 15 on the side of the outflow end face 12 and the outside-diameter decreasing part 17 in which the outside diameter decreases from the inflow end face 11 to the outflow end face 12, and therefore the honeycomb filter 100 as a whole can have excellent thermal shock resistance due to synergetic effect of these parts. If the change ratio of average diameter of the honeycomb filter 100 is less than 0.2%, even when the honeycomb filter has an outside-diameter decreasing part 17, its thermal shock resistance on the side of the inflow end face 11 will deteriorate. On the contrary, if the change ratio of average diameter of the honeycomb filter 100 exceeds 3%, thermal shock resistance on the side of the outflow end face 12 will deteriorate.

Figure 7:
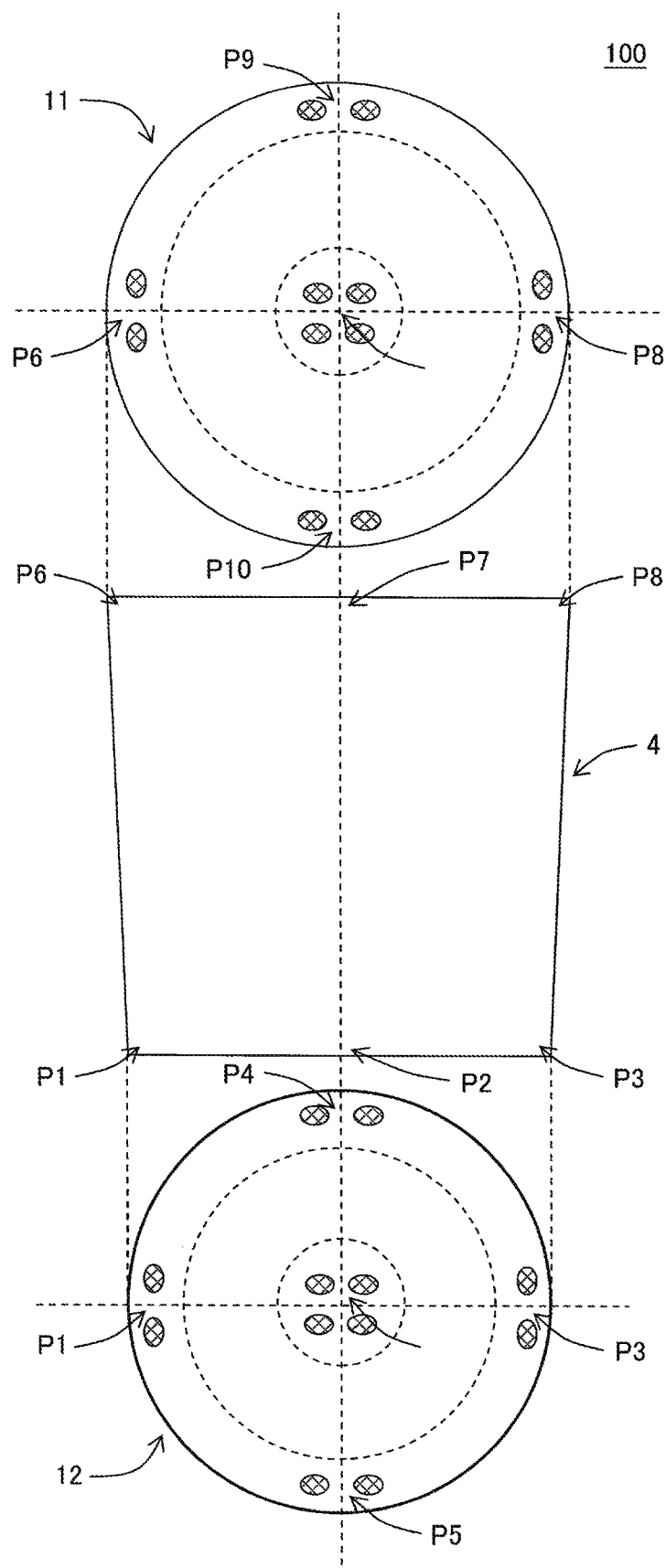
FIG. 7 is a schematic view to explain the measurement points of porosity of the honeycomb structure body in the first embodiment of the honeycomb filter of the present invention.

The dense part 15 of the honeycomb structure body 4 is present at a part of the honeycomb structure body 4 from the center region of the outflow end face 12 along the axial direction. The following describes how to measure the porosity at the center region of the outflow end face 12 of the honeycomb structure body 4 and the porosity of the circumferential region of the outflow end face 12 in more detail, with reference to FIG. 7. The following also describes how to measure the porosity at the center region of the inflow end face 11 of the honeycomb structure body 4 and the porosity of the circumferential region of the inflow end face 11. FIG. 7 is a schematic view to explain the measurement points of porosity of the honeycomb structure body in the first embodiment of the honeycomb filter of the present invention. In FIG. 7, a part indicated with reference numeral 11 in the upper part of the sheet shows the inflow end face 11 of the honeycomb structure body 4. In FIG. 7, a part indicated with reference numeral 4 at the center of the sheet shows a cross section of the honeycomb structure body 4 taken along the axial direction. This cross section in FIG. 7 is drawn while omitting the partition wall 1 and the cells 2 of the honeycomb structure body 4. In FIG. 7, a part indicated with reference numeral 12 in the lower part of the sheet shows the outflow end face 12 of the honeycomb structure body 4. The axial direction of the honeycomb structure body 4 refers to the direction from the inflow end face 11 to the outflow end face of the honeycomb structure body 4.

When the porosity of the honeycomb structure body 4 is measured, porosity of the partition wall 1 of the honeycomb structure body 4 is measured at the positions indicated with reference numerals P1 to P5 on the side of the outflow end face 12 of the honeycomb structure body 4 and the positions indicated with reference numerals P6 to P10 on the side of the inflow end face 11 of the honeycomb structure body 4, i.e., at 10 positions in total. The porosity (%) of the honeycomb structure body 4 is a value measured with a mercury porosimeter. An example of the mercury porosimeter includes Autopore 9500 (product name) produced by Micromeritics Co.

In the outflow end face 12 of FIG. 7, the part indicated with reference numeral P2 is the center region of the outflow end face 12. The center region of the outflow end face 12 indicated with reference numeral P2 is the range corresponding to 10% of the diameter of the outflow end face 12 of the honeycomb structure body 4 from the center of the outflow end face 12. Hereinafter the center region of the outflow end face 12 in such a range may be referred to as "center region P2 of the outflow end face 12" or simply as "center region P2". In the center region P2, porosity is measured at any four points in this region, and their average is the porosity (%) of the center region P2.

In the outflow end face 12 of FIG. 7, the parts indicated with reference numerals P1, P3 to P5 are the circumferential regions of the outflow end face 12. The circumferential regions of the outflow end face 12 indicated with reference numerals P1, P3 to P5 are the annular range corresponding to 10% of the diameter of the outflow end face 12 of the honeycomb structure body 4 from the outermost circumference to the inside of the outflow end face 12. Hereinafter the circumferential regions of the outflow end face 12 in such a range may be referred to as "circumferential regions P1, P3 to P5 of the outflow end face 12" or simply as "circumferential region P1, P3 to P5". In the circumferential regions P1, P3 to P5, porosity is measured at any two points in each of the regions, and their average is the porosity (%) of the corresponding circumferential regions P1, P3 to P5.

In the inflow end face 11 of FIG. 7, the part indicated with reference numeral P7 is the center region of the inflow end face 11. The center region of the inflow end face 11 indicated with reference numeral P7 is the range corresponding to 10% of the diameter of the inflow end face 11 of the honeycomb structure body 4 from the center of the inflow end face 11. Hereinafter the center region of the inflow end face 11 in such a range may be referred to as "center region P7 of the inflow end face 11" or simply as "center region P7". In the center region P7, porosity is measured at any four points in this region, and their average is the porosity (%) of the center region P7.

In the inflow end face 11 of FIG. 7, the parts indicated with reference numerals P6, P8 to P10 are the circumferential regions of the inflow end face 11. The circumferential regions of the inflow end face 11 indicated with reference numerals P6, P8 to P10 are the annular range corresponding to 10% of the diameter of the inflow end face 11 of the honeycomb structure body 4 from the outermost circumference to the inside of the inflow end face 11. Hereinafter the circumferential region of the inflow end face 11 in such a range may be referred to as "circumferential regions P6, P8 to P10 of the inflow end face 11" or simply as "circumferential regions P6, P8 to P10". In the circumferential regions P6, P8 to P10, porosity is measured at any two points in each of the regions, and their average is the porosity (%) of the corresponding circumferential region P6, P8 to P10.

In the honeycomb filter 100 of the present embodiment shown in FIGS. 1 to 6, the porosity (%) of the center region P2 is lower than the porosity (%) of each of the circumferential regions P1, P3 to P5. Especially the honeycomb filter 100 of the present embodiment has the change ratio of porosity calculated by the above Expression (1) that is 1 to 5% at the center region of the outflow end face 12.

In the above Expression (1), "Px" denotes the "porosity (%) at the center region P2 of the outflow end face 12" obtained by the method as stated above. In the above Expression (1), "Py" denotes the "average of porosity (%) at the circumferential regions P1, P3 to P5" obtained by the method as stated above.

If the dense part 15 of the honeycomb structure body 4 has the change ratio of porosity that is less than 1%, the effect of improving thermal shock resistance is not obtained. On the contrary, if the change ratio of porosity exceeds 5%, thermal shock resistance in the circumferential regions of the honeycomb structure body 4 will deteriorate. Since the honeycomb filter 100 of the present embodiment has the outside-diameter decreasing part 17 at the honeycomb structure body 4, such a decrease in thermal shock resistance at the part other than the dense part 15 can be suppressed effectively.

Since the honeycomb structure body 4 has the outside-diameter decreasing part 17 in which the outside diameter decreases from the inflow end face 11 to the outflow end face 12, its change ratio of average diameter can be within 0.2 to 3%. In the above Expression (2), Dx denotes the average diameter (mm) of the outflow end face 12 of the honeycomb structure body 4, and Dy denotes the average diameter (mm) of the inflow end face 11 of the honeycomb structure body 4. When the inflow end face 11 and the outflow end face 12 of the honeycomb structure body 4 are circular, the average diameter (mm) of the inflow end face 11 and the average diameter (mm) of the outflow end face 12 refer to the diameters (mm) of the circles. When the inflow end face 11 and the outflow end face 12 of the honeycomb structure body 4 are not circular, the average diameters (mm) are obtained by the following method. For the inflow end face 11 of the honeycomb structure body 4, the length (mm) of a long diameter and the length (mm) of a short diameter of the outside diameters passing through the geometrical center of gravity of the inflow end face 11 are measured, and their average is the average diameter (mm) of the inflow end face 11. Similarly for the outflow end face 12 of the honeycomb structure body 4, the length (mm) of a long diameter and the length (mm) of a short diameter of the outside diameters passing through the geometrical center of gravity of the outflow end face 12 are measured, and their average is the average diameter (mm) of the outflow end face 12. Hereinafter the "average diameter Dx" refers to the average diameter (mm) of the outflow end face 12. The "average diameter Dy" refers to the average diameter (mm) of the inflow end face 11. The honeycomb filter 100 of the present embodiment has the relationship of "average diameter Dx<average diameter Dy".

The dense part 15 of the honeycomb structure body 4 is present at a part of the honeycomb structure body 4 from the center region of the outflow end face 12 along the axial direction. This means that the inflow end face 11 of the honeycomb structure body 4 preferably does not include such a dense part 15 as in the outflow end face 12. For instance, the honeycomb structure body 4 has the change ratio of porosity calculated by the following Expression (3) that is less than 1% preferably at the center region of the inflow end face 11, and more preferably less than 0.8%.

$$(1-P'x/P'y) \times 100, \qquad \text{Expression (3):}$$

in Expression (3), P'x denotes the porosity (%) at the center region of the inflow end face 11, and P'y denotes the porosity (%) of a circumferential region of the inflow end face 11 other than the center region.

In the above Expression (3), "P'x" denotes the "porosity (%) at the center region P7 of the inflow end face 11" obtained by the method as stated above. In the above Expression (3), "P'y" denotes the "average of porosity (%) at the circumferential regions P6, P8 to P10" obtained by the method as stated above.

The dense part 15 of the honeycomb structure body 4 preferably has porosity of 30 to 70%, more preferably 35 to 68%, and particularly preferably 40 to 65%. The porosity of the dense part 15 of the honeycomb structure body 4 is the "porosity (%) at the center region P2 of the outflow end face 12" in FIG. 7.

In the honeycomb filter 100 of the present embodiment, the partition wall 1 preferably has a thickness of 120 to 450 µm, more preferably 135 to 400 µm, and particularly preferably 150 to 360 µm. If the thickness of the partition wall 1 is less than 120 µm, isostatic strength of the honeycomb structure body 4 may deteriorate. If the thickness of the partition wall 1 exceeds 450 pressure loss will increase, which may reduce output from the engine or degrade the fuel consumption. The thickness of the partition wall 1 is a value measured by observing a cross section orthogonal to the axial direction of the honeycomb filter 100 under an optical microscope.

The honeycomb filter 100 of the present embodiment preferably has a cell density of the cells 2 defined by the partition wall 1 that is 30 to 62 cells/cm$^2$, and 30 to 50 cells/cm$^2$ more preferably. The thus configured honeycomb filter 100 of the present embodiment can be preferably used as a filter for diesel engine.

The partition wall 1 and the circumferential wall 3 preferably include ceramic as a main component. Preferable examples of the material of the partition wall 1 and the circumferential wall 3 include at least one type selected from the group consisting of cordierite, silicon carbide, silicon-silicon carbide based composite materials, mullite, alumina, aluminum titanate, silicon nitride, cordierite forming raw material, lithium aluminum silicate, and silicon carbide-cordierite based composite materials. "Including ceramic as a main component" means that ceramic accounts for 50 mass % or more in the materials as a whole.

The circumferential wall 3 of the honeycomb structure body 4 may be monolithic with the partition wall 1 defining the cells 2 or may be a circumference coating layer that is formed by applying a circumference coating material at the circumference of the partition wall 1 defining the cells 2. During the manufacturing process, a partition wall 1 and a circumferential wall 3 may be formed in a monolithic manner, and then the circumferential wall 3 formed may be removed by a known method, such as grinding. Then, the circumference coating layer may be disposed at the circumference of the partition wall 1.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively.

The shape of the honeycomb structure body 4 is not limited especially. Examples of the shape of the honeycomb structure body 4 include a pillar shape in which the inflow end face 11 and the outflow end face 12 have a shape, such as a circle, an ellipse, and a polygon. Note here that, since the honeycomb filter 100 of the present embodiment has an outside-diameter decreasing part 17 as stated above, it has a reversed frustum shape at least at a part thereof in a strict sense. For instance, when the inflow end face 11 and the outflow end face 12 are circular, the honeycomb structure body 4 has a reversed frustum circular cone shape. Examples of the polygonal shape include a quadrangle, a pentagon, a hexagon, a heptagon, and an octagon.

The size of the honeycomb structure body 4, e.g., the length from the inflow end face 11 to the outflow end face 12 and the size of a cross section orthogonal to the extending direction of the cells 2 of the honeycomb structure body 4, is not limited especially. The size of the honeycomb filter 100 of the present embodiment may be selected appropriately so that it can have the optimum ability for purification when it is used as a DPF. For instance, the length from the inflow end face 11 to the outflow end face 12 of the honeycomb structure body 4 is preferably 80 to 400 mm, more preferably 100 to 380 mm, and particularly preferably 150 to 360 mm. The area of a cross section orthogonal to the extending direction of the cells 2 of the honeycomb structure body 4 is preferably 7000 to 130000 mm$^2$, more preferably 8500 to 120000 mm$^2$ and particularly preferably 11000 to 100000 mm$^2$.

In the honeycomb filter 100 of the present embodiment, the plugging portion 5 is disposed at open ends of the inflow cells 2a on the side of the outflow end face 12 and at open ends of the outflow cells 2b on the side of the inflow end face 11. Preferably the inflow cells 2a and the outflow cells 2b are arranged alternately via the partition wall 1. Thereby, a checkerboard pattern is preferably formed with the plugging portion 5 and the "open ends of the cells 2" at each of the end faces of the honeycomb filter 100.

The plugging portion 5 preferably is made of a material that is a preferable material of the partition wall 1. The plugging portion 5 and the partition wall 1 may be made of the same material or of different materials.

In the honeycomb filter 100 of the present embodiment, at least one of the surface of the partition wall 1 and the pores of the partition wall 1 of the honeycomb structure body 4 may be loaded with catalyst for exhaust-gas purification. The thus configured honeycomb structure can convert CO, NOx, HC or the like in the exhaust gas into harmless substances through the catalytic reaction. This also can promote oxidization of soot trapped at the partition wall 1.

When the honeycomb filter 100 of the present embodiment is loaded with a catalyst, the catalyst preferably includes one type or more selected from the group consisting of SCR catalyst, NOx storing catalyst, and oxidation catalyst. SCR catalyst is a catalyst to select a component to be purified for reduction. Especially NOx selective reduction SCR catalyst is preferably used as the SCR catalyst to select NOx in exhaust gas for reduction. Examples of the SCR catalyst include metal-substituted zeolite. Examples of metals for metal substitution of zeolite include iron (Fe) and copper (Cu). Preferable examples of zeolite include beta zeolite. SCR catalyst may be a catalyst including, as a major component, at least one type selected from the group consisting of vanadium and titania. Examples of the NOx storing catalyst include alkali metals and alkali earth metals. Examples of the alkali metals include potassium, sodium, and lithium. Examples of the alkali earth metals include calcium. Examples of the oxidation catalyst include one containing noble metals. Specifically, oxidation catalyst preferably may be a catalyst including at least one type selected from the group consisting of platinum, palladium and rhodium.

Figure 8:
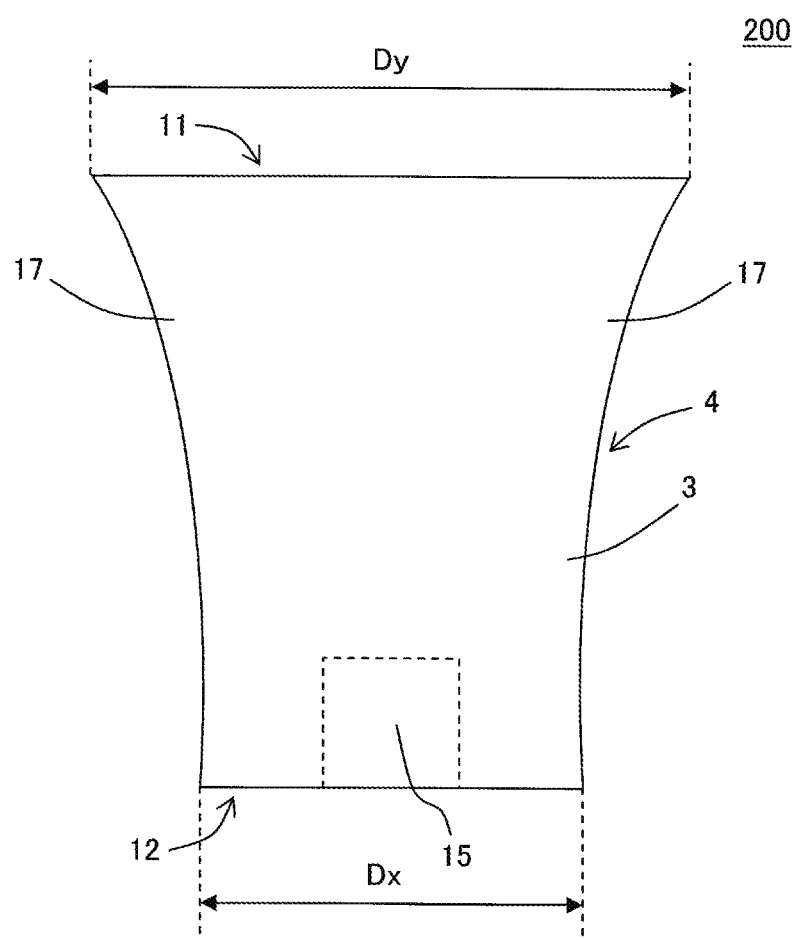
FIG. 8 is a lateral view schematically showing a second embodiment of the honeycomb filter of the present invention.
Figure 9:
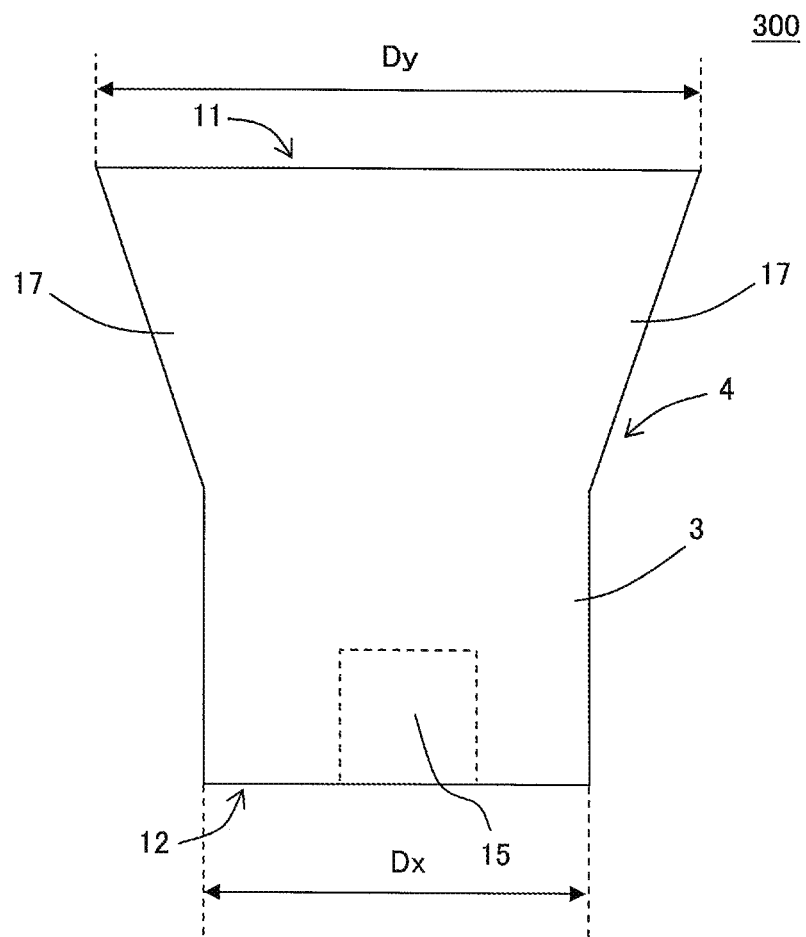
FIG. 9 is a lateral view schematically showing a third embodiment of the honeycomb filter of the present invention.
Figure 10:
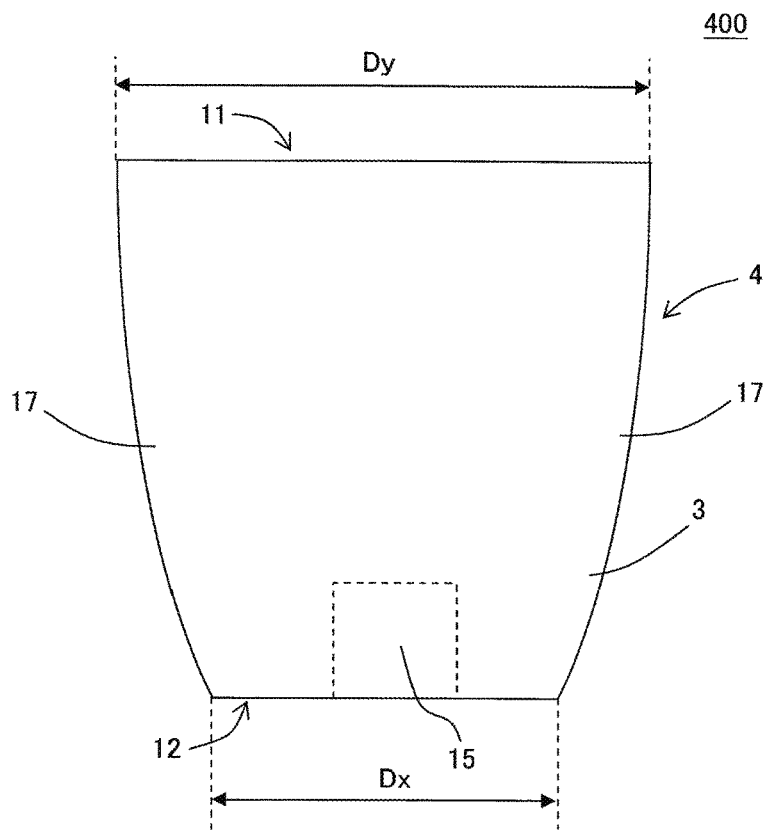
FIG. 10 is a lateral view schematically showing a fourth embodiment of the honeycomb filter of the present invention.
Figure 11:
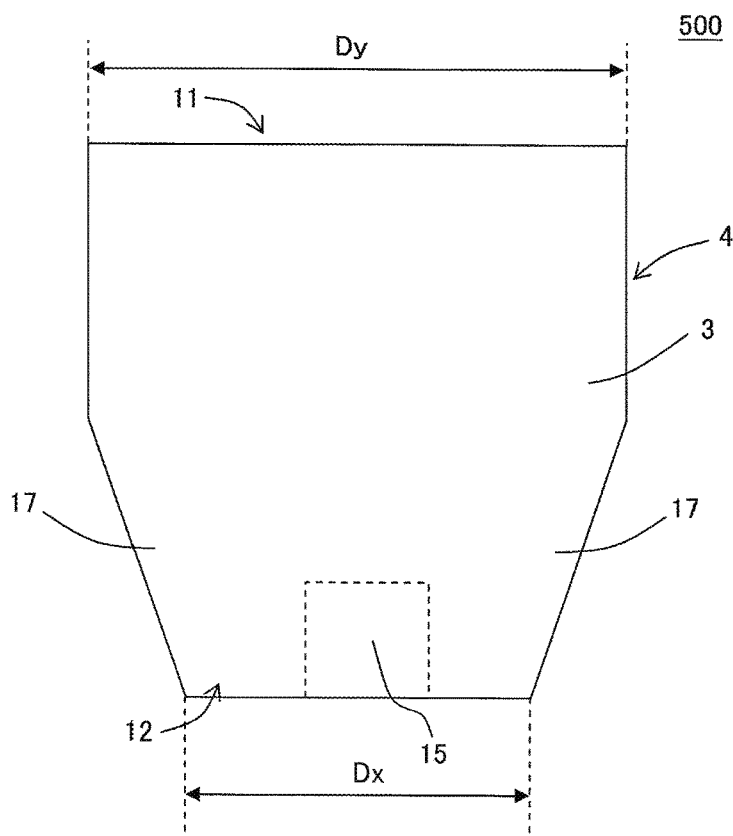
FIG. 11 is a lateral view schematically showing a fifth embodiment of the honeycomb filter of the present invention.
Figure 12:
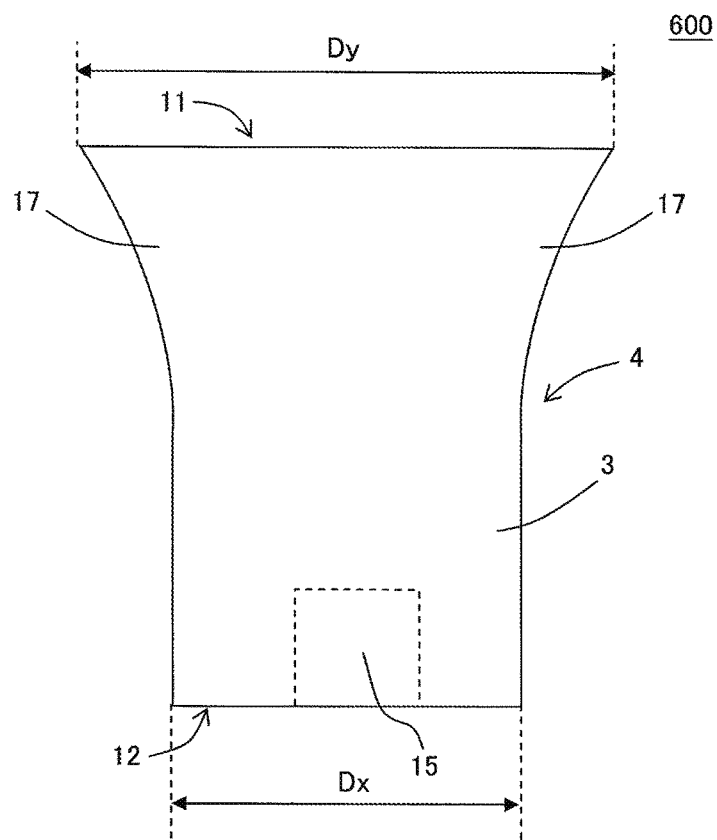
FIG. 12 is a lateral view schematically showing a sixth embodiment of the honeycomb filter of the present invention.
Figure 13:
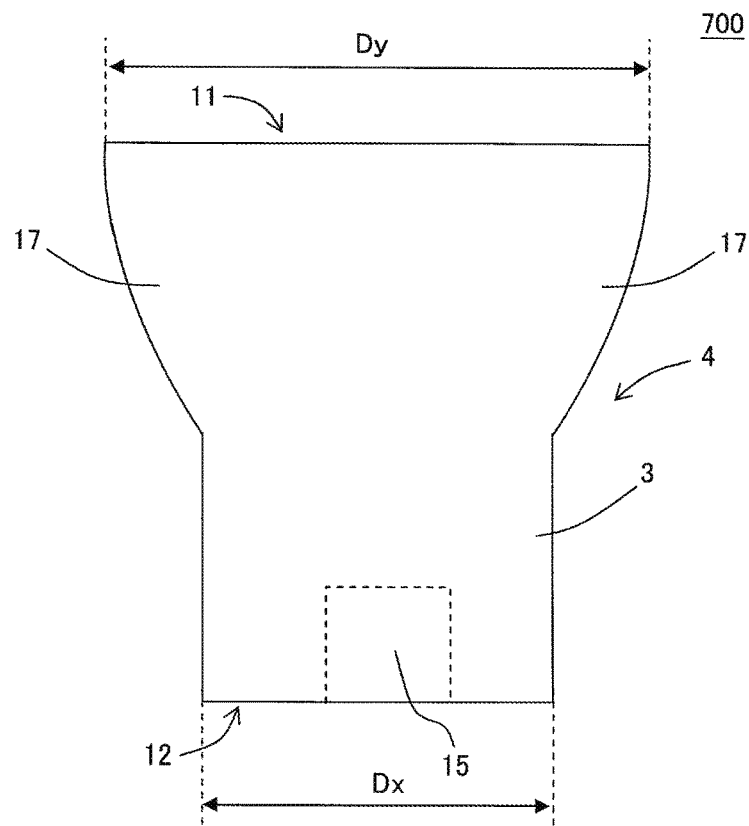
FIG. 13 is a lateral view schematically showing a seventh embodiment of the honeycomb filter of the present invention.

(2) Honeycomb Filter (Second Embodiment to Seventh Embodiment):

The following describes second to seventh embodiments of the honeycomb filter of the present invention, with reference to FIGS. 8 to 13. FIG. 8 is a lateral view schematically showing a second embodiment of the honeycomb filter of the present invention. FIG. 9 is a lateral view schematically showing a third embodiment of the honeycomb filter of the present invention. FIG. 10 is a lateral view schematically showing a fourth embodiment of the honeycomb filter of the present invention. FIG. 11 is a lateral view schematically showing a fifth embodiment of the honeycomb filter of the present invention. FIG. 12 is a lateral view schematically showing a sixth embodiment of the honeycomb filter of the present invention. FIG. 13 is a lateral view schematically showing a seventh embodiment of the honeycomb filter of the present invention.

The honeycomb filters of the second to seventh embodiments are configured similarly to the honeycomb structure bodies 4 of FIGS. 1 to 6 other than that the shape of the lateral faces of the honeycomb structure bodies are configured as in the honeycomb structure bodies 4 shown in FIGS. 8 to 13, respectively. That is, the honeycomb structure body 4 has a dense part 15, and the dense part includes a center region of the outflow end face 12 and is a part of the honeycomb structure body 4 from the center region of the outflow end face 12 along the axial direction. The dense part is configured so that its porosity is relatively lower. This dense part 15 has a change ratio of porosity that is 1 to 5%. The change ratio of porosity is calculated by the above Expression (1).

The honeycomb structure body 4 has an outside-diameter decreasing part 17 at least at a part of the honeycomb structure body 4 in the axial direction. The outside-diameter decreasing part has an outside diameter of a plane orthogonal to the axial direction of the honeycomb structure body 4 that decreases from the inflow end face 11 to the outflow end face 12. Due to such an outside-diameter decreasing part 17, the honeycomb structure body 4 has a change ratio of average diameter that is 0.2 to 3%. The change ratio of average diameter is calculated by the above Expression (2).

The honeycomb filter 200 of the second embodiment shown in FIG. 8 has a circumferential wall 3 making up the lateral face of the honeycomb structure body 4, and the circumferential wall has a tapered shape that becomes narrower from the inflow end face 11 toward the outflow end face 12. This tapered-shaped part, i.e., the entire region of the honeycomb structure body 4 in the axial direction is the outside-diameter decreasing part 17 of the honeycomb structure body 4.

The honeycomb filter 300 of the third embodiment shown in FIG. 9 has a circumferential wall 3 making up the lateral face of the honeycomb structure body 4, and the circumferential wall 3 making up the lateral face of the honeycomb structure body 4 has a reversed frustum circular cone shape at a part from the inflow end face 11 toward the outflow end face 12. The honeycomb filter 300 has a pillar shape in a certain range on the side of the outflow end face 12 in which the outside diameter does not change. In this honeycomb structure body 4, the reversed frustum circular cone shaped part and the pillar-shaped part, i.e., the entire region of the honeycomb structure body 4 in the axial direction is the outside-diameter decreasing part 17 of the honeycomb structure body 4.

The honeycomb filter 400 of the fourth embodiment shown in FIG. 10 has a circumferential wall 3 making up the lateral face of the honeycomb structure body 4, and the circumferential wall has a reversed temple bell shape from the inflow end face 11 toward the outflow end face 12. This reversed temple bell shaped part, i.e., the entire region of the honeycomb structure body 4 in the axial direction is the outside-diameter decreasing part 17 of the honeycomb structure body 4.

The honeycomb filter 500 of the fifth embodiment shown in FIG. 11 has a circumferential wall 3 making up the lateral face of the honeycomb structure body 4, and the circumferential wall has a pillar shape in a certain range from the inflow end face 11, in which the outside diameter does not change. The circumferential wall 3 making up the lateral face of the honeycomb structure body 4 has a reversed frustum circular cone shape on the side of the outflow end face 12 relative to the pillar-shaped part without a change in outside diameter. This reversed frustum circular cone shaped part is the outside-diameter decreasing part 17 of the honeycomb structure body 4.

The honeycomb filter 600 of the sixth embodiment shown in FIG. 12 has a circumferential wall 3 making up the lateral face of the honeycomb structure body 4, and the circumferential wall has a tapered shape in a certain range from the inflow end face 11 that becomes narrower toward the outflow end face 12. Then the honeycomb structure body 4 has a pillar shape without a change in outside diameter on the side of the outflow end face 12 relative to the tapered shaped part. In this honeycomb structure body 4, the tapered shaped part and the pillar-shaped part, i.e., the entire region of the honeycomb structure body 4 in the axial direction is the outside-diameter decreasing part 17.

The honeycomb filter 700 of the seventh embodiment shown in FIG. 13 has a circumferential wall 3 making up the lateral face of the honeycomb structure body 4, and the circumferential wall has a reversed temple bell shape in a certain range from the inflow end face 11. Then the honeycomb structure body 4 has a pillar shape without a change in outside diameter on the side of the outflow end face 12 relative to the reversed temple bell shaped part. In this honeycomb structure body 4, the reversed temple bell shaped part and the pillar-shaped part, i.e., the entire region of the honeycomb structure body 4 in the axial direction is the outside-diameter decreasing part 17.

The shape of the circumference of the honeycomb filter of the present invention, i.e., the shape of the honeycomb structure body in a lateral view is not limited to those in the first to the seventh embodiments described above. That is, the shape of the circumference of the honeycomb filter of the present invention can be decided appropriately depending on the usage or the like, as long as the honeycomb structure has an outside-diameter decreasing part of a desired shape so that the change ratio of average diameter calculated by the above Expression (2) is 0.2 to 3%.

Figure 14:
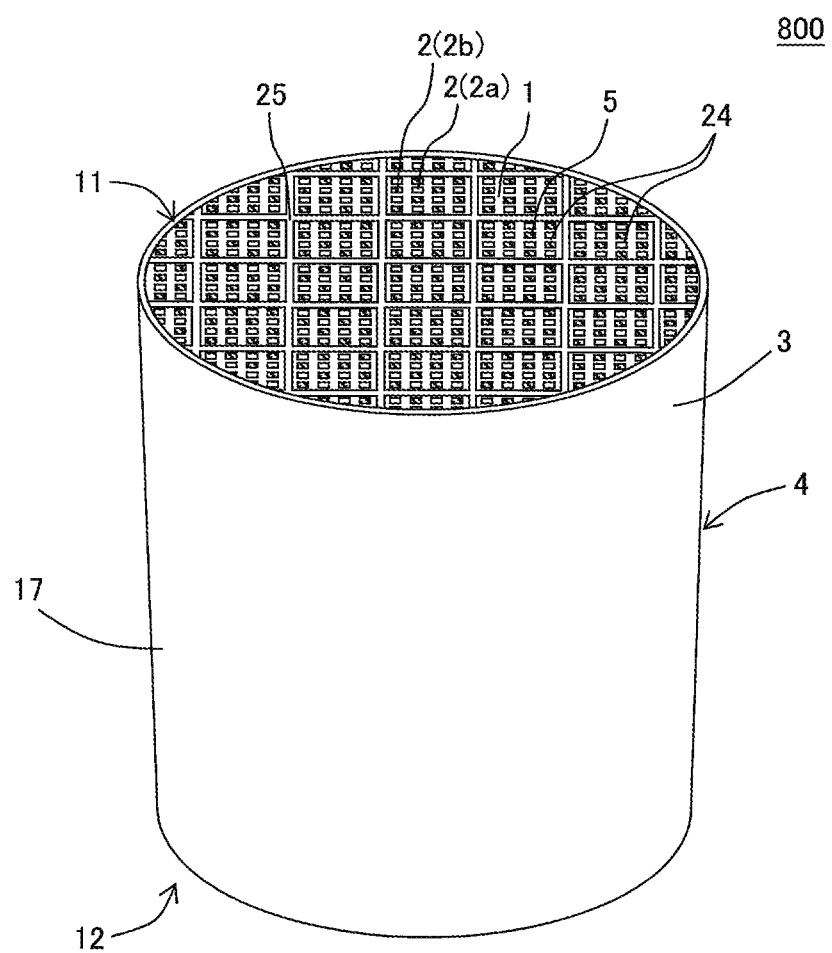
FIG. 14 is a perspective view schematically showing an eighth embodiment of a honeycomb filter of the present invention viewed from the inflow end face.
Figure 15:
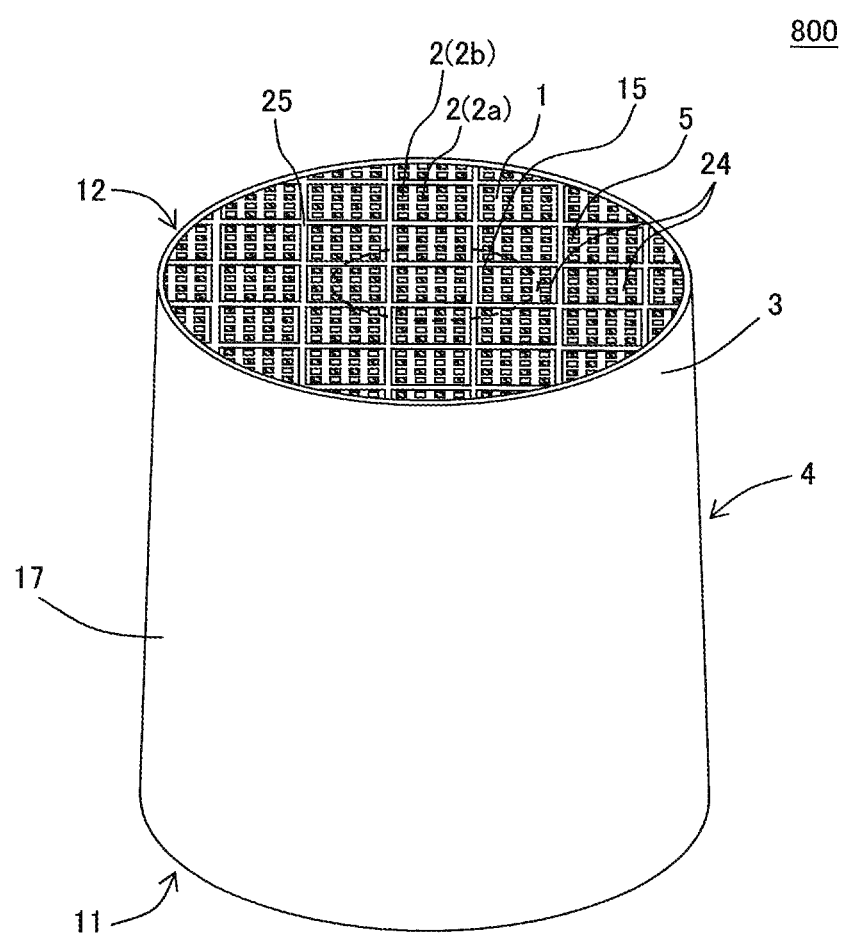
FIG. 15 is a perspective view schematically showing the eighth embodiment of the honeycomb filter of the present invention viewed from the outflow end face.

(3) Honeycomb Filter (Eighth Embodiment):

The following describes the eighth embodiment of the honeycomb filter of the present invention, with reference to FIGS. 14 and 15. FIG. 14 is a perspective view schematically showing the eighth embodiment of the honeycomb filter of the present invention viewed from the inflow end face. FIG. 15 is a perspective view schematically showing the eighth embodiment of the honeycomb filter of the present invention viewed from the outflow end face.

The honeycomb filter 800 shown in FIGS. 14 and 15 is a honeycomb filter 800 including a honeycomb structure body 4, and a plugging portion 5 disposed at any one of the ends of cells 2 formed in the honeycomb structure body 4. The honeycomb structure body 4 in FIGS. 14 and 15 has a plurality of pillar-shaped honeycomb segments 24. Then the honeycomb structure body 4 has a segmented structure so that the plurality of honeycomb segments 24 are disposed adjacent to each other and their lateral faces are opposed to each other. The plurality of honeycomb segments 24 are bonded mutually via a bonding layer 25.

In this way, in the honeycomb filter 800 of the present embodiment, its honeycomb structure body is a so-called "segmented structured honeycomb structure body". The "segmented structured honeycomb structure body" refers to a honeycomb structure body configured so that a plurality of honeycomb segments 24, each being prepared separately, are bonded. Meanwhile, the honeycomb structure body 4 as shown in FIGS. 1 to 6 having the partition wall 1 of the honeycomb structure body 4 formed monolithically may be called a "monolithic honeycomb structure body". In the honeycomb filter of the present invention, the honeycomb structure body may be a "segmented structured honeycomb structure body" or a "monolithic honeycomb structure body".

Each of the honeycomb segments 24 shown in FIGS. 14 and 15 has a porous partition wall 1 and an outer wall making up the lateral face of the honeycomb segment 24. Then these honeycomb segments 24 are bonded mutually via the bonding layer 25 that is disposed at the surface of the outer wall making up the lateral face of the honeycomb segment.

The segmented structured honeycomb structure body 4 shown in FIGS. 14 and 15 has a dense part 15, and the dense part includes a center region of the outflow end face 12 and is a part of the honeycomb structure body 4 from the center region of the outflow end face 12 along an axial direction. The dense part has a change ratio of porosity of 1 to 5%, the change ratio of porosity being calculated by the above Expression (1). This honeycomb structure body 4 has an outside-diameter decreasing part 17 at least at a part of the honeycomb structure body 4 in the axial direction. The outside-diameter decreasing part has an outside diameter of a plane orthogonal to the axial direction of the honeycomb structure body 4 that decreases from the inflow end face 11 to the outflow end face 12. Due to such an outside-diameter decreasing part 17, the honeycomb structure body 4 has a change ratio of average diameter that is 0.2 to 3%. The change ratio of average diameter is calculated by the following Expression (2).

The circumferential wall 3 of the segmented structured honeycomb structure body 4 preferably is a circumference coating layer formed with a circumference coating material applied at the circumference of the honeycomb structure body 4. The segmented structured honeycomb structure body 4 is preferably prepared by grinding the circumferential part of the honeycomb segment bonded member including the plurality of honeycomb segments 24 that are bonded, and disposing the circumference coating layer as stated above.

The honeycomb filter 800 shown in FIGS. 14 and 15 may be configured similarly to the honeycomb filters of the first embodiment to the seventh embodiment as stated above other than that the honeycomb structure body 4 is a segmented structured honeycomb structure body 4. For instance, the configuration of the dense part 15 and the outside-diameter decreasing part 17 of the honeycomb filter 800 may be the configuration similar to the dense parts and the outside-diameter decreasing parts of the honeycomb filters of the first embodiment to the seventh embodiment.

(4) Method for Manufacturing Honeycomb Filter:

The following describes a method for manufacturing the honeycomb filter of the present invention. A method for manufacturing the honeycomb filter of the present invention may include a step of manufacturing a honeycomb formed body, a step of forming a plugging portion at the open ends of the cells, and a step of drying and firing the honeycomb formed body.

(4-1) Forming Step:

A forming step is to extrude a kneaded material, which is prepared by kneading a forming raw material, into a honeycomb shape, so as to obtain a honeycomb formed body. The honeycomb formed body has a partition wall defining cells extending from a first end face to a second end face of the honeycomb formed body, and a circumferential wall that surrounds the outermost circumference of this partition wall. The honeycomb structured part made up of the partition wall is the honeycomb structure body. In the forming step, a forming raw material is firstly kneaded to be a kneaded material. Next, the obtained kneaded material is extruded, so that a honeycomb formed body is obtained, in which the partition wall and the circumferential wall are monolithically formed.

The forming raw material preferably includes dispersing medium and additives added to a ceramic raw material. Examples of the additives include organic binders, pore former and surfactant. Examples of the dispersing medium include water. The forming raw material used may be a similar forming raw material that is used in a conventionally-known method for manufacturing a honeycomb filter.

A method for preparing a kneaded material by kneading the forming raw material may be a method using a kneader or a vacuum pugmill, for example. In the extrusion, a die for extrusion may be used, and the die has a slit thereon corresponding to the cross-sectional shape of the honeycomb formed body.

(4-2) Plugging Step:

A plugging step is to plug the open ends of the cells so as to form a plugging portion. For instance, in this plugging step, the open ends of the cells are plugged with a material similar to the material used for manufacturing of the honeycomb formed body, thus forming a plugging portion. A method for forming the plugging portion can follow a conventionally-known method for manufacturing a honeycomb filter.

(4-3) Firing Step:

A firing step is to fire the honeycomb formed body having the formed plugging portion to have a honeycomb filter. Before firing the honeycomb formed body having the plugging portion, the obtained honeycomb formed body may be dried by microwaves and hot air, for example. For the honeycomb formed body before the formation of a plugging portion, the firing step may be firstly performed, for example. Then, the plugging step as stated above may be performed to the honeycomb fired body obtained by the firing step.

The temperature of firing to fire the honeycomb formed body may be decided appropriately depending on the material of the honeycomb formed body. For instance, when a honeycomb formed body is made of cordierite, the temperature for firing is preferably 1380 to 1450° C., and more preferably 1400 to 1440° C. The firing time is preferably about 4 to 6 hours, which is a time to keep the highest temperature.

When the honeycomb filter of the present invention is manufactured, firing is preferably performed at this firing step so that the center region to be the dense part on the side of the end face to be the outflow end face of the honeycomb formed body is delayed to reach a high temperature compared to other parts. With this configuration, a dense part can be formed so that the porosity at the center region at the outflow end face of the honeycomb filter to be obtained is lower than the porosity of the circumferential region.

For instance, the honeycomb formed body may be fired by a firing oven that is used for firing a honeycomb formed body at high temperature, from which fat, organic, substances and the like have been removed, under an inert gas atmosphere. The firing oven has a longitudinal shape, which is for main firing of a honeycomb formed body. In this firing oven, the honeycomb formed body is introduced into the space of the oven from one of the open ends, and is fired while being conveyed at a fixed speed along the horizontal direction until the honeycomb formed body reaches the other open end of the oven. At this time, firing is preferably performed as follows, for example. Firstly, a honeycomb formed body is placed so that its axial direction is parallel to the vertical direction, and the outflow end face of the honeycomb formed body faces downward. Then, the thus placed honeycomb formed body is fired preferably so that, at the outflow end face on the lower side, the center region to be the dense part is delayed to reach a high temperature compared to the other parts. Such a method for firing so that the center region reaches a high temperature after the other parts reaches the high temperature may be a method of firing while placing a setter so that the honeycomb formed body has a difference in temperature during the firing. A difference in temperature between the center region and the other parts at the outflow end face is not limited especially, and a difference in temperature of 15 to 100° C. may be given, for example. Thereby, a dense part can be formed so that the porosity at the center region at the outflow end face of the honeycomb filter to be obtained is lower than the porosity of the circumferential region.

After the firing step, the circumferential wall of the obtained honeycomb filter may be ground as needed, and then a circumference coating material may be applied to the circumference of the partition wall so as to have a circumference coating layer. During this grinding and application of a circumference coating material, the application is performed so that the outside diameter of a plane orthogonal to the axial direction of the honeycomb filter increases from the outflow end face to the inflow end face, and so that the honeycomb filter obtained can have a change ratio of average diameter that is 0.2 to 3%. For instance, the circumferential wall may be ground and the circumference coating layer may be formed by the following methods 1 to 3. In the method 1, the circumferential wall is ground so that the circumference wall has the same size from the outflow end face to the inflow end face, and the circumference coating material is applied so that the circumference coating layer becomes thinner from the inflow end face to the outflow end face. In the method 2, the circumferential wall is ground so that the side of the outflow side end face becomes smaller, and the circumference coating material is applied so that it has the same thickness from the outflow end face to the inflow end face. In the method 3, the circumferential wall is ground so that the side of the outflow side end face has the same size from the outflow end face to the inflow end face, and the circumference coating layer is applied so that the circumference coating material has the same thickness from the inflow end face to the outflow end face. After drying, grinding the circumference coating layer is performed so that the diameter becomes smaller from the inflow end face to the outflow end face.

When the honeycomb filter having a segmented structured honeycomb structure body of the present invention is to be manufactured, a plurality of precursors of honeycomb segments is prepared firstly as a honeycomb formed body, and these precursors of honeycomb segments is fired to have a plurality of honeycomb segments. Next, a plugging portion is formed so as to plug open ends of the cells of the honeycomb segments. Then, these manufactured plurality of honeycomb segments are bonded via a bonding layer, whereby a honeycomb segment bonded member including the plurality of honeycomb segments that are bonded is manufactured. Thereafter, the circumferential wall of the obtained honeycomb segment bonded member is ground, and then a circumference coating material is applied to the circumference of the partition wall so as to have a honeycomb filter having a circumferential wall made up of the circumference coating layer. During this grinding and application of a circumference coating material, the application is performed so that the outside diameter of a plane orthogonal to the axial direction of the honeycomb filter increases from the outflow end face to the inflow end face, and so that the honeycomb filter obtained can have a change ratio of average diameter that is 0.2 to 3%.

EXAMPLES

Example 1

0.5 part by mass of pore former, 33 parts by mass of dispersing medium, and 5.6 parts by mass of organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the pore former, water absorptive polymer of 10 to 50 µm in average particle diameter was used. As the organic binder, methylcellulose was used. As the dispersing agent, dextrin was used.

Next, the kneaded material was extruded using a predetermined die, so that a honeycomb formed body having the quadrangular cells and having a round pillar shape as the overall shape was obtained.

Next, the honeycomb formed body was dried by a hot-air drier. The drying was performed under the condition of 95 to 145° C.

Next, a plugging portion was formed to the dried honeycomb formed body. Specifically a mask was firstly applied to the inflow end face of the honeycomb formed body so as to cover the inflow cells. Subsequently the masked end at of the honeycomb formed body was immersed in slurry for plugging to fill the open ends of the outflow cells without the mask with the slurry for plugging. Subsequently the outflow end face of the honeycomb formed body also was filled with slurry for plugging at the open ends of the inflow cells similarly to the above. Subsequently the honeycomb formed body having the plugging portion formed was further dried by a hot-air drier.

Next, the dried honeycomb formed body was placed on a firing setter made of alumina so that the outflow end face of the honeycomb filter to be formed faced downward. Next, the honeycomb formed body was fired by a tunnel kiln (continuous firing oven). The firing was performed under the conditions of 1350 to 1440° C. for 10 hours, whereby a honeycomb fired body was obtained. In Example 1, temperature was raised during the firing so that the temperature of the center region at the outflow end face was delayed by 50° C. compared to the temperature of the other parts.

Next, the circumferential face of the obtained honeycomb fired body was ground. At this time, the grinding was performed so that the outside diameter of the honeycomb fired body decreased from the inflow end face to the outflow end face. Subsequently, a circumference coating material was applied to the lateral face of the ground honeycomb fired body so as to form a circumference coating layer. In this way, the honeycomb filter of Example 1 was manufactured.

The honeycomb filter of Example 1 had a dense part at the outflow end face, and the dense part included a center region of the outflow end face and was a part from the center region of the outflow end face along the axial direction. The dense part was configured so that its porosity was lower than the porosity of the circumferential region on the outside of the center region. The obtained honeycomb filter had an outside-diameter decreasing part 17 as in the honeycomb filter 100 of FIG. 3. The outside-diameter decreasing part had an outside diameter of a plane orthogonal to the axial direction of the honeycomb structure body 4 that decreased from the inflow end face 11 to the outflow end face 12.

The honeycomb filter of Example 1 had the thickness of the partition wall of 300 µm and the cell density of 46.5 cells/cm$^2$. The cells had a quadrangular shape. In the fields of "cell structure" of Table 1, the thickness of the partition wall, the cell density and the cell shape are shown.

The honeycomb filter of Example 1 had a round shape in cross section orthogonal to the axial direction, and had the circumferential shape as shown in FIG. 3 as stated above.

The honeycomb filter had a diameter at the inflow end face that was 266.7 mm, and had a length (overall length) from the inflow end face to the outflow end face that was 304.8 mm. The shapes of the honeycomb filter of Example 1 are written in the fields of "cross-sectional shape", "circumferential shape" and "overall length" of Table 1. In the field of "forming method" of the "circumferential shape" of Table 1, "monolithic" is written when the honeycomb filter had a circumferential wall that was formed monolithically with the partition wall. When the honeycomb filter had a circumference coating layer formed by removing the circumferential wall monolithically formed with the partition wall by processing of the circumference and applying a circumference coating material so as to surround the partition wall, "circumference processing" is written in this field. In the field of "diameter" of Table 1, the value of "target diameter of the inflow end face" of the honeycomb filter is shown, and the actual diameter (Dx, Dy) of the manufactured honeycomb filter is shown in Table 3.

For the honeycomb filter of Example 1, the porosity was measured at the measurement points of P1 to P10 of FIG. 7. Table 2 shows the measurement result of porosity. Based on the measurement result of porosity, "average of P1, P3 to P5" and "average of P6, P8 to P10" were obtained. Table 2 shows the result.

Based on the values of porosity at the measurement points of P1 to P10, the change ratio of porosity (%) at the outflow end face and at the inflow end face was calculated by the above Expression (1) or (3). Table 3 shows the result.

The average diameter Dx (mm) at the outflow end face of the honeycomb structure body and the average diameter Dy (mm) at the inflow end face of the honeycomb structure body were obtained. The average diameter Dx at the outflow end face was 266.0 mm, and the average diameter Dy at the inflow end face was 266.7 mm. Based on the values of the average diameter Dx and the average diameter Dy, the change ratio of average diameter was calculated by the above Expression (2). Table 3 shows the result.

TABLE 1

| | | Cell structure | | | | Circumferential shape | | | | | |
|---|---|---|---|---|---|---|---|---|---|---|---|
| | Material | Thickness of partition wall (μm) | Cell density (cells/cm$^2$) | Cell shape | Cross-sectional shape | Forming method | Reference drawing | Diameter (mm) | Long diameter (mm) | Short diameter (mm) | Overall length (mm) |
| Ex. 1 | cordierite | 300 | 46.5 | quadrangle | circle | circumference processing | FIG. 3 | 266.7 | — | — | 304.8 |
| Ex. 2 | cordierite | 305 | 46.5 | HAC | circle | circumference processing | FIG. 8 | 266.7 | — | — | 254.0 |
| Ex. 3 | cordierite | 410 | 31 | quadrangle | circle | circumference processing | FIG. 8 | 228.6 | — | — | 200.0 |
| Ex. 4 | cordierite | 355 | 31 | HAC | ellipse | circumference processing | FIG. 8 | — | 228.6 | 137.2 | 152.4 |
| Ex. 5 | cordierite | 300 | 46.5 | hexagon | circle | circumference processing | FIG. 9 | 266.7 | — | — | 254.0 |
| Ex. 6 | cordierite | 303 | 46.5 | quadrangle | circle | circumference processing | FIG. 12 | 355.6 | — | — | 304.8 |
| Ex. 7 | cordierite | 230 | 46.5 | quadrangle | circle | monolithic | FIG. 8 | 118.4 | — | — | 100.0 |
| Ex. 8 | cordierite | 405 | 46.5 | HAC | circle | circumference processing | FIG. 10 | 143.8 | — | — | 152.4 |
| Ex. 9 | cordierite | 355 | 46.5 | HAC | circle | monolithic | FIG. 8 | 132.1 | — | — | 127.0 |
| Ex. 10 | cordierite | 301 | 46.5 | quadrangle | circle | circumference processing | FIG. 13 | 304.8 | — | — | 355.6 |
| Ex. 11 | cordierite | 255 | 46.5 | quadrangle | circle | circumference processing | FIG. 11 | 190.5 | — | — | 200.0 |
| Ex. 12 | cordierite | 203 | 31 | HAC | circle | circumference processing | FIG. 8 | 190.5 | — | — | 150.0 |
| Ex. 13 | cordierite | 178 | 46.5 | quadrangle | circle | circumference processing | FIG. 9 | 280.0 | — | — | 254.0 |
| Ex. 14 | SiC | 305 | 46.5 | quadrangle | circle | circumference processing | FIG. 3 | 228.6 | — | — | 152.4 |
| Ex. 15 | SiC | 254 | 46.5 | HAC | circle | circumference processing | FIG. 3 | 172.0 | — | — | 200.0 |

TABLE 2

| | Porosity (%) | | | | | | | | | | |
|---|---|---|---|---|---|---|---|---|---|---|---|
| | Outflow end face | | | | | | Inflow end face | | | | |
| | P1 | P2 | P3 | P4 | P5 | P1, P3 to P5 average | P6 | P7 | P8 | P9 | P10 | P6, P8 to P10 average |
| Ex. 1 | 65.0 | 63.5 | 65.3 | 64.8 | 65.5 | 65.2 | 65.0 | 65.3 | 64.8 | 65.5 | 65.2 | 65.1 |
| Ex. 2 | 67.1 | 63.8 | 67.3 | 66.8 | 66.5 | 66.9 | 67.0 | 66.8 | 67.1 | 66.9 | 67.2 | 67.1 |
| Ex. 3 | 64.1 | 62.8 | 64.3 | 64.5 | 64.3 | 64.3 | 64.0 | 64.2 | 64.1 | 64.3 | 64.4 | 64.2 |
| Ex. 4 | 68.0 | 66.8 | 68.1 | 67.9 | 67.8 | 68.0 | 68.0 | 68.1 | 67.9 | 68.2 | 68.1 | 68.1 |
| Ex. 5 | 65.1 | 63.8 | 65.3 | 65.3 | 65.1 | 65.2 | 65.1 | 65.2 | 65.3 | 65.0 | 64.9 | 65.1 |
| Ex. 6 | 66.1 | 63.9 | 65.9 | 66.2 | 66.3 | 66.1 | 66.1 | 66.2 | 66.4 | 66.3 | 66.2 | 66.3 |

TABLE 2-continued

| | Porosity (%) | | | | | | | | | | |
|---|---|---|---|---|---|---|---|---|---|---|---|
| | Outflow end face | | | | | | Inflow end face | | | | |
| | P1 | P2 | P3 | P4 | P5 | P1, P3 to P5 average | P6 | P7 | P8 | P9 | P10 | P6, P8 to P10 average |
| Ex. 7 | 64.0 | 63.0 | 64.1 | 64.2 | 64.3 | 64.2 | 63.9 | 64.0 | 64.1 | 64.4 | 63.9 | 64.1 |
| Ex. 8 | 48.0 | 46.0 | 48.2 | 48.1 | 47.9 | 48.1 | 48.1 | 48.3 | 48.2 | 47.9 | 48.1 | 48.1 |
| Ex. 9 | 50.1 | 48.0 | 49.9 | 49.8 | 49.9 | 49.9 | 50.2 | 50.3 | 50.1 | 50.2 | 49.9 | 50.1 |
| Ex. 10 | 58.1 | 56.0 | 58.2 | 58.3 | 58.1 | 58.2 | 58.1 | 58.3 | 57.9 | 58.2 | 58.3 | 58.1 |
| Ex. 11 | 52.1 | 50.0 | 52.5 | 52.3 | 52.4 | 52.3 | 52.3 | 52.1 | 51.5 | 52.3 | 52.4 | 52.1 |
| Ex. 12 | 58.0 | 57.0 | 58.3 | 58.2 | 58.3 | 58.2 | 58.1 | 58.2 | 58.3 | 58.3 | 58.5 | 58.3 |
| Ex. 13 | 55.1 | 53.8 | 55.3 | 55.5 | 56.0 | 55.5 | 55.2 | 55.5 | 55.3 | 54.9 | 55.2 | 55.2 |
| Ex. 14 | 52.0 | 50.0 | 52.1 | 52.3 | 52.4 | 52.2 | 52.3 | 52.3 | 52.5 | 52.0 | 52.1 | 52.2 |
| Ex. 15 | 42.0 | 40.5 | 42.3 | 42.4 | 42.3 | 42.3 | 42.3 | 42.0 | 41.9 | 42.4 | 42.5 | 42.3 |

TABLE 3

| | Maximum change ratio of porosity at one end face (%) | | Average diameter (mm) | | |
|---|---|---|---|---|---|
| | Outflow end face | Inflow end face | Outflow end face Dx | Inflow end face Dy | Change ratio of average diameter (%) |
| Ex. 1 | 2.5 | −0.3 | 266.0 | 266.7 | 0.26 |
| Ex. 2 | 4.7 | 0.4 | 264.0 | 266.8 | 1.05 |
| Ex. 3 | 2.3 | 0.0 | 222.0 | 228.8 | 2.97 |
| Ex. 4 | 1.7 | −0.1 | 181.9 | 182.9 | 0.55 |
| Ex. 5 | 2.1 | −0.2 | 265.8 | 266.7 | 0.34 |
| Ex. 6 | 3.4 | 0.1 | 353.0 | 355.7 | 0.76 |
| Ex. 7 | 1.8 | 0.1 | 118.4 | 118.8 | 0.34 |
| Ex. 8 | 4.3 | −0.5 | 143.5 | 144.0 | 0.35 |
| Ex. 9 | 3.9 | −0.4 | 130.0 | 132.1 | 1.59 |
| Ex. 10 | 3.7 | −0.3 | 302.8 | 304.8 | 0.66 |
| Ex. 11 | 4.4 | 0.0 | 190.0 | 190.7 | 0.37 |
| Ex. 12 | 2.1 | 0.2 | 189.6 | 190.6 | 0.52 |
| Ex. 13 | 3.0 | −0.6 | 276.0 | 280.0 | 1.43 |
| Ex. 14 | 4.2 | −0.1 | 227.8 | 228.6 | 0.35 |
| Ex. 15 | 4.1 | 0.7 | 168.0 | 172.1 | 2.38 |

Examples 2 to 13

Honeycomb filter of Examples 2 to 13 were manufactured by changing the cell structure, the cross-sectional shape, the circumferential shape and the like as in Table 1. The honeycomb structures of Examples 2 to 13 had the circumferential shapes corresponding to any one of the shapes in FIGS. 3, 8 to 13. The fields of "reference drawing" of the "circumferential shape" of Table 1 show to which one of the shapes of FIGS. 3, 8 to 13 the honeycomb structure of each Example corresponds. For instance, when "FIG. 8" is written in the field of "reference drawing" of the "circumferential shape" of Table 1, the honeycomb filter has the circumferential shape corresponding to the shape of FIG. 8.

In Examples 2 to 13, the amount of pore former added to the kneaded material was adjusted appropriately, so as to control the porosity of the honeycomb filter to be formed. Temperature was raised during the firing so that the temperature of the center region at the outflow end face faced downward was delayed by 15 to 100° C. compared to the temperature at the other parts.

Examples 14 and 15

In Examples 14 and 15, segmented structured honeycomb filters as shown in FIGS. 14 and 15 were manufactured. Specifically 80 parts by mass of silicon carbide powder and 20 parts by mass of Si powder were mixed to obtain mixture powder. To the mixture powder, binder, a pore former and water were added, followed by mixing and kneading, to have a kneaded material.

Next, the kneaded material was extruded using a die for manufacturing a honeycomb formed body to have a honeycomb formed body having a quadrangular-prism shape as the overall shape. Thirty-two honeycomb formed bodies were manufactured in Example 14, and twenty-five honeycomb formed bodies were manufactured in Example 15.

Next, these honeycomb formed bodies were dried by a microwave dryer, and then were dried completely by a hot-air drier, and then both end faces of each of the honeycomb formed bodies were cut so as to have predetermined dimensions.

Next, a plugging portion was formed to the dried honeycomb formed bodies. Specifically a mask was firstly applied to the inflow end face of each honeycomb formed body so as to cover the inflow cells. Subsequently the masked end of the honeycomb formed body was immersed in slurry for plugging to fill the open ends of the outflow cells without the mask with the slurry for plugging. Subsequently the outflow end face of the honeycomb formed body also was filled with slurry for plugging at the open ends of the inflow cells similarly to the above. Subsequently the honeycomb formed body having the plugging portion formed was further dried by a hot-air drier.

Next the honeycomb formed body having the plugging portion formed therein was degreased and fired, so as to obtain a honeycomb fired body. Degreasing was performed at 550° C. for 3 hours. Firing was performed at 1450° C. for 2 hours in an argon atmosphere. The honeycomb fired body had a quadrangular-prism shape as the overall shape. The honeycomb fired body had a square shape at the end faces, and the square had the length of 37 mm in one side. This honeycomb fired body was a honeycomb segment of the honeycomb structure body. The honeycomb segment to be disposed at the center of the segmented structure was manufactured as follows. Firstly, the fired honeycomb segments were prepared, and 150 parts by mass of colloidal silica (solution having solid content of 40%) and 200 parts by mass of water were added to 150 parts by mass of SiC particles in 2 μm of particle diameter, followed by stirring well, to prepare a slurry for modification. Subsequently, a part on the end face corresponding to the outflow side at a height of 20 mm in the overall length direction was immersed in this slurry for modification, and then excess slurry was removed by air blowing. Next, the slurry was dried, and heat treatment was performed at 700° C., whereby a honeycomb segment having low porosity on the outflow side was prepared.

Next, thirty two honeycomb fired bodies for Example 14 and twenty five honeycomb fired bodies for Example 15 were disposed adjacently so that their lateral faces are opposed, and were bonded with a bonding material, whereby honeycomb bonded members were manufactured. In Example 14, the honeycomb bonded member was manufactured so that the honeycomb fired bodies were disposed six in rows and six in columns at the end faces, i.e., thirty two in totals (the number obtained by excluding four located at the four corners of the honeycomb bonded member). In Example 15, the honeycomb bonded member was manufactured so that the honeycomb fired bodies were disposed five in rows and five in columns at the end faces, i.e., twenty five in totals.

Next, the circumferential face of the obtained honeycomb bonded member was ground. At this time, the grinding was performed so that the outside diameter of the honeycomb fired body decreased from the inflow end face to the outflow end face. Subsequently, a circumference coating material was applied to the lateral face of the ground honeycomb bonded member to form a circumference coating layer. In this way, the honeycomb filters of Examples 14 and 15 were manufactured.

For the honeycomb filters of Examples 2 to 15, the porosity was measured at the measurement points of P1 to P10 of FIG. 7. Table 2 shows the measurement result of the porosity. Based on the measurement result of porosity, "average of P1, P3 to P5" and "average of P6, P8 to P10" were obtained. Table 2 shows the result.

Based on the values of porosity at the measurement points of P1 to P10, the change ratio of porosity (%) at the inflow end face and at the outflow end face of the honeycomb filters of Examples 2 to 15 was calculated by the above Expression (1) or (3). Table 3 shows the result.

The average diameter Dx (mm) at the outflow end face of the honeycomb structure body and the average diameter Dy (mm) at the inflow end face of the honeycomb structure body were obtained, and the change ratio of average diameter was calculated by the above Expression (2). Table 3 shows the result.

For the honeycomb filters of Examples 1 to 15, their "thermal shock resistance (robustness)" was evaluated by the following method. Table 4 shows the result. For the "thermal shock resistance (robustness)", evaluation was made by comparing each of the honeycomb filters of Examples 1 to 15 with the honeycomb filters of Comparative Example having the same number among Comparative Examples 1 to 15 as described later.

[Thermal Shock Resistance (Robustness)]

The following test was conducted to the honeycomb filters. Then thermal shock resistance (robustness) of the honeycomb filters was evaluated based on the presence or absence of cracks on the honeycomb filters after the test. Specifically using an engine bench coming with a 2.2-L diesel engine, the engine was operated under the conditions of the number of rotations of the engine: 2000 rpm and the engine torque: 60 Nm so as to deposit 2 to 12 g/L of soot at the inside of the honeycomb filters of Examples and Comparative Examples. Next, regeneration processing was performed using post injection to increase the inlet gas temperature of the honeycomb filter. When pressure loss measured in front of and after the honeycomb filter began to decrease, the post injection was stopped, and the engine was switched to an idle state. For the deposited amount of soot at this time, the test was conducted so that Example and Comparative Example having the same number had the same amount of soot, while setting the highest temperature at the center part of the end face on the outflow side at 1000° C. in each standard of the Example. Then, the presence or absence of cracks was observed visually at the inflow end face and at the outflow end face of the honeycomb filters. Table 4 shows the result of observation at the outflow end face and the result of observation at the inflow end face.

When no cracks were observed, the honeycomb structure was evaluated as pass, and "OK" is written in Table 4.

When cracks were observed, the honeycomb structure was evaluated as fail, and "NG" is written in Table 4.

[General Evaluation]

General evaluation on thermal shock resistance was made based on the following evaluation criteria. Table 4 shows the result.

When both of the inflow end face and the outflow end face was "OK" for the evaluation of thermal shock resistance, the honeycomb structure was evaluated as "A".

When at least one of the inflow end face and the outflow end face was "NG" for the evaluation of thermal shock resistance, the honeycomb structure was evaluated as "C".

TABLE 4

| | Thermal shock resistance (robustness) | | |
| --- | --- | --- | --- |
| | Outflow end face | Inflow end face | General |
| Ex. 1 | OK | OK | A |
| Ex. 2 | OK | OK | A |
| Ex. 3 | OK | OK | A |
| Ex. 4 | OK | OK | A |
| Ex. 5 | OK | OK | A |
| Ex. 6 | OK | OK | A |
| Ex. 7 | OK | OK | A |
| Ex. 8 | OK | OK | A |
| Ex. 9 | OK | OK | A |
| Ex. 10 | OK | OK | A |
| Ex. 11 | OK | OK | A |
| Ex. 12 | OK | OK | A |
| Ex. 13 | OK | OK | A |
| Ex. 14 | OK | OK | A |
| Ex. 15 | OK | OK | A |

Comparative Examples 1 to 15

Honeycomb filters of Comparative Examples 1 to 15 were manufactured by changing the cell structure, the cross-sectional shape, the circumferential shape and the like as in Table 5. The honeycomb filters of Comparative Examples 1 to 15 had the circumferential shapes corresponding to any one of the shapes in FIGS. 3, 8 to 13. In Comparative Examples 14 and 15, segmented structured honeycomb filters were manufactured by the method similar to Examples 14 and 15.

For the honeycomb filters of Comparative Examples 1 to 15, the porosity was measured at the measurement points of P1 to P10 of FIG. 7. Table 6 shows the measurement result of the porosity. Based on the measurement result of porosity, "average of P1, P3 to P5" and "average of P6, P8 to P10" were obtained. Table 6 shows the result.

Based on the values of porosity at the measurement points of P1 to P10, the change ratio of porosity (%) at the inflow end face and at the outflow end face of the honeycomb filters of Comparative Examples 1 to 15 was calculated by the above Expression (1) or (3). Table 7 shows the result.

The average diameter Dx (mm) at the outflow end face of the honeycomb structure body and the average diameter Dy (mm) at the inflow end face of the honeycomb structure body were obtained, and the change ratio of average diameter was calculated by the above Expression (2). Table 7 shows the result.

For the honeycomb filters of Comparative Examples 1 to 15, "thermal shock resistance" was evaluated by the method similar to Example 1. Table 8 shows the result.

TABLE 5

| | | Cell structure | | | | | | | | |
|---|---|---|---|---|---|---|---|---|---|---|
| | | Thickness of partition wall (μm) | Cell density (cells/cm²) | Cell shape | Cross-sectional shape | Circumferential shape | | Diameter (mm) | Long diameter (mm) | Short diameter (mm) | Overall length (mm) |
| | Material | | | | | Forming method | Reference drawing | | | | |
| Comp. Ex. 1 | cordierite | 300 | 46.5 | quadrangle | circle | circumference processing | FIG. 3 | 266.7 | — | — | 304.8 |
| Comp. Ex. 2 | cordierite | 305 | 46.5 | HAC | circle | circumference processing | FIG. 8 | 266.7 | — | — | 254.0 |
| Comp. Ex. 3 | cordierite | 410 | 31 | quadrangle | circle | circumference processing | FIG. 8 | 228.6 | — | — | 200.0 |
| Comp. Ex. 4 | cordierite | 355 | 31 | HAC | ellipse | circumference processing | FIG. 8 | — | 228.6 | 137.2 | 152.4 |
| Comp. Ex. 5 | cordierite | 300 | 46.5 | hexagon | circle | circumference processing | FIG. 9 | 266.7 | — | — | 254.0 |
| Comp. Ex. 6 | cordierite | 303 | 46.5 | quadrangle | circle | circumference processing | FIG. 12 | 355.6 | — | — | 304.8 |
| Comp. Ex. 7 | cordierite | 230 | 46.5 | quadrangle | circle | monolithic | FIG. 8 | 118.4 | — | — | 100.0 |
| Comp. Ex. 8 | cordierite | 405 | 46.5 | HAC | circle | circumference processing | FIG. 10 | 143.8 | — | — | 152.4 |
| Comp. Ex. 9 | cordierite | 355 | 46.5 | HAC | circle | monolithic | FIG. 8 | 132.1 | — | — | 127.0 |
| Comp. Ex. 10 | cordierite | 301 | 46.5 | quadrangle | circle | circumference processing | FIG. 13 | 304.8 | — | — | 355.6 |
| Comp. Ex. 11 | cordierite | 255 | 46.5 | quadrangle | circle | circumference processing | FIG. 11 | 190.5 | — | — | 200.0 |
| Comp. Ex. 12 | cordierite | 203 | 31 | HAC | circle | circumference processing | FIG. 8 | 190.5 | — | — | 150.0 |
| Comp. Ex. 13 | cordierite | 178 | 46.5 | quadrangle | circle | circumference processing | FIG. 9 | 280.0 | — | — | 254.0 |
| Comp. Ex. 14 | SiC | 305 | 46.5 | quadrangle | circle | circumference processing | FIG. 3 | 228.6 | — | — | 152.4 |
| Comp. Ex. 15 | SiC | 254 | 46.5 | HAC | circle | circumference processing | FIG. 3 | 172.0 | — | — | 200.0 |

TABLE 6

| | Porosity (%) | | | | | | | | | | |
|---|---|---|---|---|---|---|---|---|---|---|---|
| | Outflow end face | | | | | | Inflow end face | | | | |
| | P1 | P2 | P3 | P4 | P5 | P1, P3 to P5 average | P6 | P7 | P8 | P9 | P10 | P6, P8 to P10 average |
| Comp. Ex. 1 | 65.1 | 65.2 | 65.2 | 64.9 | 65.3 | 65.1 | 64.9 | 65.2 | 65.1 | 65.3 | 65.2 | 65.1 |
| Comp. Ex. 2 | 67.3 | 66.0 | 67.1 | 66.9 | 66.8 | 67.0 | 66.9 | 66.9 | 67.2 | 67.3 | 67.3 | 67.2 |
| Comp. Ex. 3 | 64.3 | 58.0 | 64.5 | 64.6 | 64.0 | 64.4 | 64.1 | 64.3 | 64.5 | 64.4 | 64.2 | 64.3 |
| Comp. Ex. 4 | 67.9 | 63.5 | 68.0 | 68.1 | 68.2 | 68.1 | 67.9 | 68.2 | 68.1 | 68.3 | 68.2 | 68.1 |
| Comp. Ex. 5 | 65.1 | 61.0 | 65.2 | 65.3 | 65.5 | 65.3 | 65.1 | 65.2 | 65.3 | 65.3 | 65.0 | 65.2 |
| Comp. Ex. 6 | 66.0 | 65.7 | 66.1 | 65.9 | 65.8 | 66.0 | 66.0 | 66.3 | 66.2 | 66.4 | 66.5 | 66.3 |
| Comp. Ex. 7 | 64.0 | 63.9 | 64.2 | 64.3 | 64.2 | 64.2 | 63.8 | 64.0 | 64.2 | 64.2 | 64.0 | 64.1 |
| Comp. Ex. 8 | 47.9 | 47.7 | 48.1 | 48.2 | 48.0 | 48.1 | 48.0 | 48.3 | 48.3 | 48.0 | 48.1 | 48.1 |
| Comp. Ex. 9 | 50.0 | 46.0 | 50.1 | 50.0 | 49.9 | 50.0 | 50.2 | 50.4 | 50.1 | 50.1 | 50.1 | 50.1 |
| Comp. Ex. 10 | 58.1 | 57.9 | 58.3 | 58.2 | 58.1 | 58.2 | 58.0 | 58.3 | 57.9 | 58.1 | 58.3 | 58.1 |
| Comp. Ex. 11 | 51.9 | 50.0 | 52.3 | 52.5 | 52.4 | 52.3 | 52.5 | 52.1 | 51.8 | 52.5 | 52.4 | 52.3 |
| Comp. Ex. 12 | 58.1 | 57.0 | 58.2 | 58.3 | 58.3 | 58.2 | 58.2 | 58.2 | 58.2 | 58.3 | 58.4 | 58.3 |
| Comp. Ex. 13 | 55.1 | 52.0 | 55.1 | 55.3 | 56.0 | 55.4 | 55.0 | 55.5 | 55.5 | 54.9 | 55.2 | 55.2 |
| Comp. Ex. 14 | 51.9 | 51.7 | 51.2 | 52.3 | 52.4 | 52.0 | 52.1 | 52.3 | 52.4 | 52.0 | 52.2 | 52.2 |
| Comp. Ex. 15 | 41.9 | 39.0 | 42.3 | 42.5 | 42.3 | 42.3 | 42.3 | 42.0 | 41.9 | 42.4 | 42.5 | 42.3 |

TABLE 7

| | Maximum change ratio of porosity at one end face (%) | | Average diameter (mm) | | |
|---|---|---|---|---|---|
| | Outflow end face | Inflow end face | Outflow end face Dx | Inflow end face Dy | Change ratio of average diameter (%) |
| Comp. Ex. 1 | −0.1 | −0.1 | 266.4 | 266.7 | 0.11 |
| Comp. Ex. 2 | 1.5 | 0.4 | 266.3 | 266.7 | 0.15 |
| Comp. Ex. 3 | 9.9 | 0.0 | 220.0 | 228.8 | 3.85 |
| Comp. Ex. 4 | 6.7 | −0.1 | 182.8 | 182.9 | 0.05 |
| Comp. Ex. 5 | 6.5 | 0.0 | 255.0 | 266.7 | 4.39 |
| Comp. Ex. 6 | 0.4 | 0.0 | 352.0 | 355.7 | 1.04 |
| Comp. Ex. 7 | 0.4 | 0.1 | 118.4 | 118.5 | 0.08 |
| Comp. Ex. 8 | 0.7 | −0.4 | 139.0 | 143.8 | 3.34 |
| Comp. Ex. 9 | 8.0 | −0.5 | 129.0 | 132.1 | 2.35 |
| Comp. Ex. 10 | 0.5 | −0.4 | 304.5 | 304.8 | 0.10 |
| Comp. Ex. 11 | 4.4 | 0.3 | 191.0 | 190.3 | −0.37 |
| Comp. Ex. 12 | 2.1 | 0.1 | 190.3 | 190.6 | 0.16 |
| Comp. Ex. 13 | 6.1 | −0.6 | 279.5 | 280.0 | 0.18 |
| Comp. Ex. 14 | 0.5 | −0.2 | 221.0 | 228.6 | 3.32 |
| Comp. Ex. 15 | 7.7 | 0.7 | 171.9 | 172.1 | 0.12 |

TABLE 8

| | Thermal shock resistance (robustness) | | |
|---|---|---|---|
| | Outflow end face | Inflow end face | General |
| Comp. Ex. 1 | NG | NG | C |
| Comp. Ex. 2 | OK | NG | C |
| Comp. Ex. 3 | NG | OK | C |
| Comp. Ex. 4 | NG | NG | C |
| Comp. Ex. 5 | NG | OK | C |
| Comp. Ex. 6 | NG | OK | C |
| Comp. Ex. 7 | NG | NG | C |
| Comp. Ex. 8 | NG | OK | C |
| Comp. Ex. 9 | NG | OK | C |
| Comp. Ex. 10 | NG | NG | C |
| Comp. Ex. 11 | OK | NG | C |
| Comp. Ex. 12 | OK | NG | C |
| Comp. Ex. 13 | NG | NG | C |
| Comp. Ex. 14 | NG | OK | C |
| Comp. Ex. 15 | NG | NG | C |

(Results)

As shown in Table 4, all of the honeycomb filters of Examples 1 to 15 had favorable results for the evaluation on "thermal shock resistance". The honeycomb filters of Comparative Examples 1 to 15 generated cracks at least at one of the outflow end face and the inflow end face of the honeycomb filters.

The honeycomb filter of the present invention can be used for a filter to trap soot in exhaust gas emitted from a diesel engine.

DESCRIPTION OF REFERENCE NUMERALS

1: partition wall, 2: cell, 2a: inflow cell, 2b: outflow cell, 3: circumferential wall, 4: honeycomb structure body, 5: plugging portion, 11: inflow end face, 12: outflow end face, 15: dense part, 17: outside-diameter decreasing part, 24: honeycomb segment, 25: bonding layer, 100, 200, 300, 400, 500, 600, 700, 800: honeycomb filter, P1, P3 to P5: circumferential region (circumferential region of outflow end face), P2: center region (center region of outflow end face), P6, P8 to P10: circumferential region (circumferential region of inflow end face), P7: center region (center region of inflow end face), Dx: average diameter of outflow end face, Dy: average diameter of inflow end face

What is claimed is:

1. A honeycomb filter, comprising a honeycomb structure body having an inflow end face and an outflow end face, the honeycomb structure body including: a porous partition wall defining a plurality of cells extending from the inflow end face to the outflow end face and serving as a through channel of fluid; and a circumferential wall disposed to surround the partition wall, and
a plugging portion disposed to plug any one of the ends of the cells in the honeycomb structure body, wherein
the honeycomb structure body has a dense part, the dense part including a center region of the outflow end face and being a part of the honeycomb structure body from the center region of the outflow end face along an axial direction, and the dense part having a change ratio of porosity of 1 to 5%, the change ratio of porosity being calculated by the following Expression (1), and
the honeycomb filter body has an outside-diameter decreasing part at least at a part of the honeycomb structure body in the axial direction, the outside-diameter decreasing part having an outside diameter of a plane orthogonal to the axial direction of the honeycomb structure body that decreases from the inflow end face to the outflow end face, and the honeycomb structure body has a change ratio of average diameter that is 0.2 to 3%, the change ratio of average diameter being calculated by the following Expression (2), $$(1-P_x/P_y) \times 100, \qquad \text{Expression (1):}$$

where in Expression (1), $P_x$ denotes porosity (%) at the center region of the outflow end face, and Py denotes porosity (%) of a circumferential region of the outflow end face other than the center region, $$(1-D_x/D_y) \times 100, \qquad \text{Expression (2):}$$

where in Expression (2), $D_x$ denotes an average diameter (mm) of the outflow end face of the honeycomb structure body, and $D_y$ denotes an average diameter (mm) of the inflow end face of the honeycomb structure body.

2. The honeycomb filter according to claim 1, wherein the center region of the inflow end face of the honeycomb structure body has a change ratio of porosity calculated by the following Expression (3) that is less than 1%, $$(1-P'x/P'y) \times 100, \qquad \text{Expression (3):}$$

where in Expression (3), P'x denotes porosity (%) at the center region of the inflow end face, and P'y denotes porosity (%) of a circumferential region of the inflow end face other than the center region.

3. The honeycomb filter according to claim 1, wherein the dense part has porosity of 30 to 70%.

4. The honeycomb filter according to claim 1, wherein the outside-diameter decreasing part is present across an overall region of the honeycomb structure body in the axial direction.

5. The honeycomb filter according to claim 1, wherein the outside-diameter decreasing part is present at only a part of the honeycomb structure body in the axial direction.

6. The honeycomb filter according to claim 1, wherein the circumferential wall of the honeycomb structure body includes a circumference coating layer disposed at circumference of the partition wall.

7. The honeycomb filter according to claim 1, wherein the honeycomb structure body has a plurality of pillar-shaped honeycomb segments, and has a segmented structure in which the plurality of honeycomb segments are disposed adjacent to each other and lateral faces of the honeycomb segments are opposed to each other.

* * * * *